United States Patent
Katz et al.

(10) Patent No.: US 8,905,427 B2
(45) Date of Patent: Dec. 9, 2014

(54) CONVERTIBLE SINGLE AND MULTI-SEAT STROLLER

(75) Inventors: Geva Katz, Kiryat Ata (IL); Oron Lazarovich, Rehovot (IL)

(73) Assignee: Baby Jogger, LLC, Richmond, VA (US)

( * ) Notice: Subject to any disclaimer, the term of this patent is extended or adjusted under 35 U.S.C. 154(b) by 267 days.

(21) Appl. No.: 12/599,356

(22) PCT Filed: Apr. 30, 2008

(86) PCT No.: PCT/IL2008/000577
§ 371 (c)(1),
(2), (4) Date: Nov. 9, 2009

(87) PCT Pub. No.: WO2008/135974
PCT Pub. Date: Nov. 13, 2008

(65) Prior Publication Data
US 2010/0301585 A1    Dec. 2, 2010

(30) Foreign Application Priority Data

May 7, 2007  (IL) .......................................... 183033

(51) Int. Cl.
| | |
|---|---|
| *B62B 7/14* | (2006.01) |
| *B60B 33/02* | (2006.01) |
| *B60B 33/00* | (2006.01) |
| *B62B 7/10* | (2006.01) |
| *B62B 5/06* | (2006.01) |
| *B62B 7/04* | (2006.01) |
| *B62B 7/00* | (2006.01) |

(52) U.S. Cl.
CPC .............. *B62B 7/142* (2013.01); *B60B 33/025* (2013.01); *B60B 33/0005* (2013.01); *B62B 2207/02* (2013.01); *B62B 5/064* (2013.01); *B62B 5/065* (2013.01); *B60B 33/021* (2013.01); *B60B 33/0068* (2013.01); *B62B 5/067* (2013.01); *B62B 2301/04632* (2013.01); *B60B 33/0042* (2013.01); *B60B 33/0049* (2013.01); *B62B 7/044* (2013.01); *B62B 7/008* (2013.01); *B60B 33/0057* (2013.01); *B60B 33/0086* (2013.01); *B60B 33/0015* (2013.01); *B60B 33/0002* (2013.01); *B62B 7/10* (2013.01); *B60B 33/0073* (2013.01)
USPC ...... 280/648; 280/650; 280/47.38; 280/47.39

(58) Field of Classification Search
USPC ......... 280/642–650, 657–658, 33.993, 47.39, 280/47.38; 297/109, 130, 131, 133, 233, 297/240, 256, 256.12, 256.16, 344.21
See application file for complete search history.

(56) References Cited

U.S. PATENT DOCUMENTS

| 119,331 | A | * | 9/1871 | Dinsmore ...................... 297/240 |
| 1,138,802 | A | * | 5/1915 | Shermer ....................... 297/240 |

(Continued)

FOREIGN PATENT DOCUMENTS

| EP | 1057709 | 12/2000 |
| EP | 1153817 | 11/2001 |

(Continued)

OTHER PUBLICATIONS

International Search Report for International Application No. PCT/IL08/00577 mailed Apr. 7, 2009.

*Primary Examiner* — Katy M Ebner
*Assistant Examiner* — Emma K Frick
(74) *Attorney, Agent, or Firm* — Pike IP Law, PLLC; Bernard G. Pike

(57) ABSTRACT

A stroller device comprising at least one carriage, the carriage comprising a support unit for supporting at least one person, typically an infant, a wheels assembly coupled to the support unit, an engagement element for engaging the carriage to another such carriage and a pivoting element coupled to the support unit allowing rotating the support unit with respect to the carriage. The support unit may be rotatably reoriented so as to allow transporting the stroller device such that the support unit of the carriage and the other support unit of the other carriage can be aligned in a train state or alternatively in a side-by-side state.

16 Claims, 20 Drawing Sheets

(56) References Cited

U.S. PATENT DOCUMENTS

| | | | |
|---|---|---|---|
| 1,269,379 A * | 6/1918 | Burke | 297/183.9 |
| 1,707,186 A | 3/1929 | Chatfield | |
| 1,890,469 A | 12/1932 | Powers | |
| 3,223,431 A * | 12/1965 | Gottfried et al. | 280/47.38 |
| 3,612,603 A | 10/1971 | Snyder | |
| 3,726,536 A | 4/1973 | Arino | |
| 4,222,132 A | 9/1980 | Crim et al. | |
| 4,349,938 A * | 9/1982 | Fontana | 16/35 R |
| 4,391,453 A * | 7/1983 | Glaser | 280/47.4 |
| 4,403,807 A | 9/1983 | Wilkinson | |
| 4,684,148 A * | 8/1987 | Glaser | 280/647 |
| 4,725,071 A | 2/1988 | Shamie | |
| D296,540 S | 7/1988 | Perego | |
| 4,805,938 A * | 2/1989 | Redmond et al. | 280/47.35 |
| D300,310 S | 3/1989 | Kassai | |
| 4,834,415 A | 5/1989 | Yee | |
| 4,834,452 A * | 5/1989 | Goodrich | 297/240 |
| 4,858,947 A | 8/1989 | Yee et al. | |
| 4,872,692 A | 10/1989 | Steenburg | |
| D305,316 S | 1/1990 | Lin | |
| 4,969,656 A | 11/1990 | Clausen | |
| 5,018,754 A | 5/1991 | Cheng | |
| 5,033,761 A | 7/1991 | Kelly | |
| D321,850 S | 11/1991 | Mong-Hsing | |
| 5,064,209 A | 11/1991 | Kurschat | |
| D328,047 S | 7/1992 | Huang | |
| 5,167,425 A | 12/1992 | Chen | |
| 5,221,106 A | 6/1993 | Shamie | |
| 5,230,523 A | 7/1993 | Wilhelm | |
| D348,489 S | 7/1994 | Monneret | |
| 5,338,096 A * | 8/1994 | Huang | 297/243 |
| D360,392 S | 7/1995 | Lewandowski | |
| D370,437 S | 6/1996 | Siesholtz | |
| D382,516 S | 8/1997 | Hutchinson | |
| 5,653,460 A | 8/1997 | Fogarty | |
| 5,664,795 A | 9/1997 | Haung | |
| 5,772,235 A | 6/1998 | Espenshade | |
| D404,344 S | 1/1999 | Espenshade et al. | |
| 5,887,935 A | 3/1999 | Sack | |
| 5,918,892 A * | 7/1999 | Aaron et al. | 280/47.38 |
| 6,086,087 A | 7/2000 | Yang | |
| 6,099,022 A | 8/2000 | Pring | |
| D430,512 S | 9/2000 | Yang | |
| D431,212 S | 9/2000 | Haung | |
| 6,267,406 B1 | 7/2001 | Huang | |
| D452,191 S | 12/2001 | Carpenter | |
| 6,357,784 B1 * | 3/2002 | Mitzman | 280/642 |
| 6,361,111 B1 * | 3/2002 | Bowers et al. | 297/344.22 |
| 6,375,213 B1 | 4/2002 | Suzuki | |
| 6,431,579 B1 | 8/2002 | Kaneko | |
| 6,527,294 B1 * | 3/2003 | Brewington et al. | 280/647 |
| 6,536,842 B2 * | 3/2003 | Bowers et al. | 297/344.22 |
| 6,585,284 B2 | 7/2003 | Sweeney | |
| 6,676,140 B1 * | 1/2004 | Gondobintoro | 280/33.993 |
| 6,679,506 B2 | 1/2004 | Koppes | |
| 6,752,405 B1 * | 6/2004 | Wright | 280/47.38 |
| 6,843,498 B2 | 1/2005 | Bretschger | |
| 6,935,652 B2 | 8/2005 | Fair | |
| 6,938,906 B1 | 9/2005 | Black | |
| 6,938,954 B1 | 9/2005 | Hendren et al. | 297/256.12 |
| 7,025,364 B1 | 4/2006 | Clarke | |
| 7,364,183 B2 * | 4/2008 | Lee | 280/642 |
| D568,794 S * | 5/2008 | Siewertsen | D12/129 |
| 7,367,581 B2 * | 5/2008 | Yang | 280/642 |
| 7,516,966 B2 | 4/2009 | Gray | |
| D593,458 S | 6/2009 | Dong Xu | |
| D595,621 S | 7/2009 | Ci Xiao | |
| D598,333 S | 8/2009 | Li | |
| 7,597,332 B2 * | 10/2009 | Thompson | 280/47.38 |
| 7,896,384 B2 * | 3/2011 | Schonfeld | 280/647 |
| 8,128,103 B1 * | 3/2012 | Schutzendorf et al. | 280/33.993 |
| 8,157,273 B2 * | 4/2012 | Bar-Lev | 280/47.39 |
| 8,398,143 B1 * | 3/2013 | Haley | 296/65.06 |
| 2004/0251063 A1 * | 12/2004 | Patterson et al. | 180/65.1 |
| 2007/0045975 A1 * | 3/2007 | Yang | 280/47.38 |
| 2009/0115151 A1 | 5/2009 | Van Dijk | |
| 2009/0160162 A1 | 6/2009 | Bizzell | |
| 2010/0038887 A1 * | 2/2010 | Bar-Lev | 280/658 |
| 2010/0140902 A1 * | 6/2010 | Zehfuss | 280/650 |
| 2011/0175330 A1 * | 7/2011 | Smith et al. | 280/649 |

FOREIGN PATENT DOCUMENTS

| | | |
|---|---|---|
| EP | 1190930 | 3/2002 |
| EP | 1764282 | 3/2007 |
| EP | 1935751 | 6/2008 |
| GB | 2368824 | 5/2002 |
| GB | 2373484 | 9/2002 |
| JP | 4232175 | 8/1992 |
| WO | 02081287 | 10/2002 |
| WO | WO 2005/021351 | 3/2005 |
| WO | WO2005021351 | 3/2005 |
| WO | 2006056795 | 6/2006 |
| WO | 2007033562 | 3/2007 |
| WO | 2007131222 | 11/2007 |
| WO | 2008013566 | 1/2008 |
| WO | 2008127128 | 10/2008 |

* cited by examiner

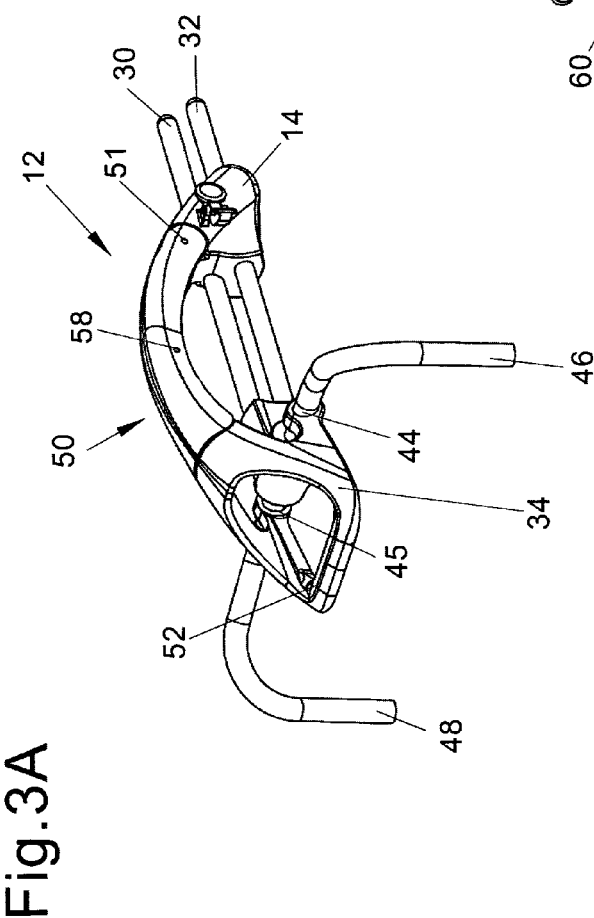
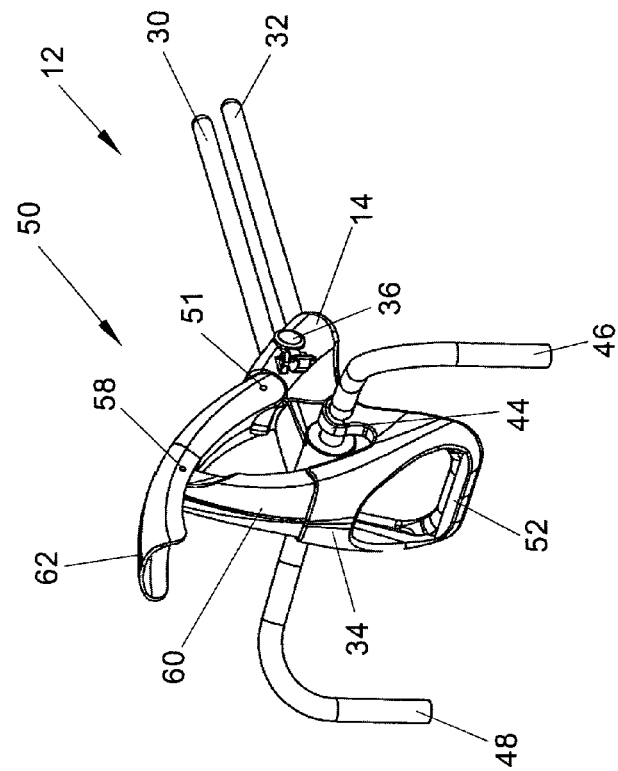

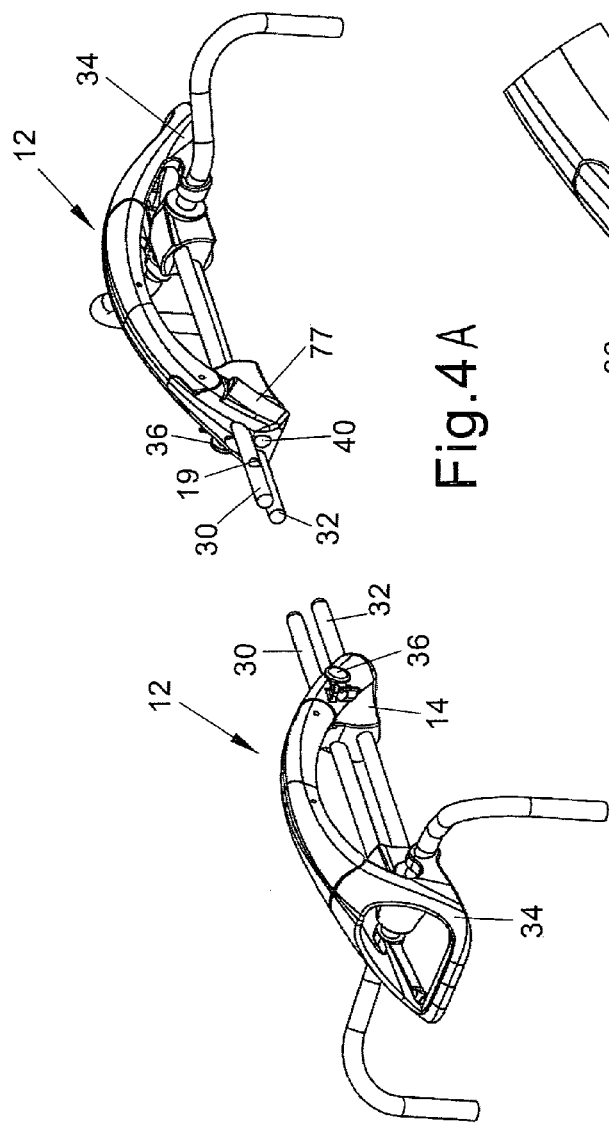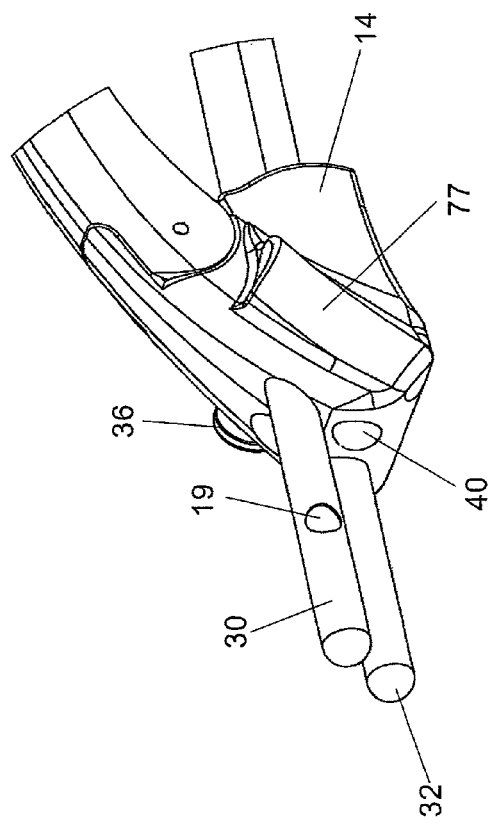
Fig. 4A
Fig. 4B

CONVERTIBLE SINGLE AND MULTI-SEAT STROLLER

CROSS-REFERENCE TO RELATED APPLICATIONS

This application is a National Phase Application of PCT International Application No. PCT/IL2008/000577, entitled "Convertible Single and Multi-Seat Stroller", International Filing Date Apr. 30, 2008, published on Nov. 13, 2008 as International Publication No. WO 2008/135974, which in turn claims priority from Israel Patent Application No. 183033, filed May 7, 2007, both of which are incorporated herein by reference in their entirety.

FIELD OF THE INVENTION

The present invention relates to strollers and carriages. More specifically the present invention relates to a convertible single and multi-seat stroller

BACKGROUND OF THE INVENTION

Strollers and carriages (hereinafter referred to as "strollers") for the transportation of infants and small children have been in use for many years. Also in common use are strollers offering seating options for two children. Typically present day strollers are designed so as to have children seated in different and desired inclination angles and in a fixed-angle position facing frontward, in the direction of the advancement of the stroller. Various assemblies and designs have been developed for reversibly connecting two single strollers to a single double-seat stroller-unit, thus providing a choice of using a two-seater stroller only when necessary and increasing the ease and safeness of maneuverability when transporting two small children, not necessarily of the same age.

Given below are prior art patents listing different techniques for the connection of two single strollers to a single stroller unit:

In 1928 Chatfield R., in U.S. Pat. No. 1,707,186 invented a device comprising a stretchable wheel axis composed of a shaft with a sliding bar on which, at will, a single or two strollers could be positioned.

In U.S. Pat. No. 4,805,938 Redmond T. and Redmond R. invented a device for connecting two baby strollers together consisting of a pair of bars or poll bracket units spaced apart and clamped between frames of the baby strollers so that a single person can operate the strollers simultaneously for transporting two babies therein.

In Patent Application WO2005/021351 Thompson J. and Peterson T. describe a device in which two strollers are reversibly connected by aligning and interlocking the front wheels of a stroller with the rear wheels of second stroller, thus more than two strollers can be connected in a column forming "a train" of strollers.

In GB 2,368,824 Colin A. describes a device comprising two independent strollers, referred to as "pushchairs", that can be linked together in either a side-by-side or a column "train arrangement. The linkage is done by "securement members" that interlock the two strollers without any structural adjustments or changes in either of the pushchairs.

In GB 2,373,484 Sear L. and Croot C. describe a device comprising rails with a generally rectangular or tubular cross-section that reversibly secure and fasten frames of two strollers in a parallel side-by-side position. In the joint strollers formation one of the two wheels in the front and one of the two wheels in the rear may be inwardly folded by pivots so as to enable the maneuvering of single-stroller unit having just 6 wheels.

Typically, the present technology of connecting two strollers to a single stroller-unit, as described in the quoted patents, predetermines the fixation of the two strollers in either a side-by-side positioning or a longitudinal, "train" positioning.

In order to be conveniently store and easily transport various mechanical devices have been developed to enable the folding and collapsing of strollers. An example of such a prior art technique for folding is given in U.S. Pat. No. 5,221,106 by Shamie L. in which a stroller comprises two side frames supporting a fabric seat between them; the frames having the ability to fold inwardly by a scissor-motion of a support structure that connects the side frames together. Typically in present day strollers, either collapsible or fixed-frame stroller-units, are composed so that the length dimension of the strollers is predetermined and fixed.

The advantage of a stroller in accordance to the present invention is the ability to reversibly connect two independent strollers to a single stroller-unit and when doing so to have the ability to choose a desired state, either a side-by-side or longitudinal, "train" position. In addition to determining the state of two strollers, it is possible in accordance to the device of the present invention, by varying the swirl-angle of the seats to determine the direction-position of two children in connected strollers, either facing each other, facing opposite directions or partially facing each other.

Another advantage of a stroller in accordance to the present invention is the ability to change at will the longitude distance between two connected strollers, thus having the possibility of reducing the footprint of the connected strollers by shortening the length dimension of the stroller-unit, facilitating better maneuverability when required.

The ability to change at will the distance between two connected strollers has a significant bearing on tempering with the interaction between the children in the strollers, a factor that can be of major importance in transporting children.

SUMMARY OF THE INVENTION

There is thus provided, in accordance with some preferred embodiments of the present invention, a stroller device comprising at least one carriage, the carriage comprising a support unit for supporting at least one person, typically an infant, a wheels assembly coupled to the support unit, an engagement element for engaging the carriage to another carriage of said at least one carriage, and a pivoting element coupled to the support unit allowing rotating the support unit with respect to the carriage, facilitating the support unit to be rotatably reoriented so as to allow transporting the stroller device such that the support unit of the carriage and the other support unit of the other carriage can be aligned in a train state or alternatively in a side-by-side state.

Furthermore, in accordance with some preferred embodiments of the present invention, the device comprises at least two carriages of said at least one carriage.

Furthermore, in accordance with some preferred embodiments of the present invention, the engagement element comprises at least one bar and a connector provided with a bore for receiving a matching bar.

Furthermore, in accordance with some preferred embodiments of the present invention, the engagement element comprises a hollow bar with an opening into which a matching bar may be inserted and slide.

Furthermore, in accordance with some preferred embodiments of the present invention, the device comprises a compacting mechanism so as to facilitate reducing and alternatively increasing the footprint of the stroller device, when the stroller device comprises at least two carriages.

Furthermore, in accordance with some preferred embodiments of the present invention, the compacting mechanism comprises a foot actuator.

Furthermore, in accordance with some preferred embodiments of the present invention, the wheels assembly comprises at least three wheels.

Furthermore, in accordance with some preferred embodiments of the present invention, the wheels assembly comprises four wheels.

Furthermore, in accordance with some preferred embodiments of the present invention, the carriage comprises a push-handle.

Furthermore, in accordance with some preferred embodiments of the present invention, the push-handle is foldable.

Furthermore, in accordance with some preferred embodiments of the present invention, the length of the push-handle is adjustable.

Furthermore, in accordance with some preferred embodiments of the present invention, the wheels assembly comprises an elevating mechanism for elevating at least one of the wheels with respect to the other wheels.

Furthermore, in accordance with some preferred embodiments of the present invention, at least one of the wheels is detachable from the wheels assembly.

Furthermore, in accordance with some preferred embodiments of the present invention, at least some of the wheels of the wheels assembly comprise swivel wheels.

Furthermore, in accordance with some preferred embodiments of the present invention, the swivel wheels have a fixed position allowing fixing the swivel wheels in at least one orientation.

Furthermore, in accordance with some preferred embodiments of the present invention, the swivel wheels can be fixed in four perpendicular orientations.

Furthermore, in accordance with some preferred embodiments of the present invention, the support unit comprises a seat with an adjustable back-rest.

Furthermore, in accordance with some preferred embodiments of the present invention, the support unit comprises an adjustable leg-rest.

Furthermore, in accordance with some preferred embodiments of the present invention, the carriage is foldable.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals. In the Figures the term "frontal side" refers to the side of the single, small wheel, in a single stroller state, as illustrated in FIG. 1 given below and does not necessarily relate to the direction of motion of the stroller. The "rear side" refers to the side of a single stroller state with the relatively larger wheels and does not necessarily relate to the direction of motion of the stroller.

FIG. 3A is an illustration of a WAC viewed from the rear. The WAC is shown in a stretched state.

FIG. 3B is an illustration of a WAC viewed from the rear. The WAC is shown in a compact state.

FIG. 4A is an illustration of two stretched-state WACs placed in a front to front position prior to being connected.

FIG. 4B is a detailed illustration of a section of a frontal wheel axial structure (FWAS) that serves in connecting two WACs, thus connecting two strollers to a single stroller unit.

DETAILED DESCRIPTION OF PREFERRED EMBODIMENTS

The present invention is directed at a stroller device that enables the user to reversibly engage or connect (i.e. may be disconnected later) with ease two strollers to obtain a single stroller-unit. The connection can be by either coupling the two strollers in a longitudinal train-state or in a side-by-side state. When connecting, the distance between the connected strollers can be varied at will, from a "compacted" state, referred to as a state where the seats are close to each other, to a "stretched" state, where the seats are wide apart. In the "stretched" state the back of the seats of the frontal seating-position may be reclined substantially more than in the "compacted" state, adding to the comfort of transport. In the compacted state the footprint of the stroller-unit is considerably reduced as compared when in the extended "stretched" state, enabling easier maneuverability in crowded and narrow locations such as when traveling in narrow elevators or strolling along aisles in a shop.

When in a longitudinal train-state the direction of the two seats in the stroller-unit can be varied to either having both seats facing the direction of advancing, having the front seat facing the back seat, or having the seats perpendicular to each other. Together with the side-by-side state of the stroller unit, where the seats are positioned in parallel to the direction of advancing, the person guiding the stroller-unit can at will determine the sitting interaction between the two children in the stroller-unit, depending on circumstances and mood of the children.

Given below are schematic illustrations of the stroller in accordance with the present invention. It should be clear that the description of the embodiments and attached Figures set forth in this specification serves only for a better understanding of the invention, without limiting its scope.

In order to simplify the text describing and explaining the present invention the following abbreviations are used:

Seat Support Unit: SSU. The term "seat" refers to include both a proper seat and a cradle or crib for infants. The proper seat can be adjusted and fixed in various sitting states from up right sitting to reclining.

Wheels Assembly Construction: WAC. The term "wheels" refers to either a single wheel or a pair wheels assembled in parallel in a single functional unit.

Rear Wheel Axial Structure: RWAS,

Frontal Wheel Axial Structure: FWAS

Figure 1:
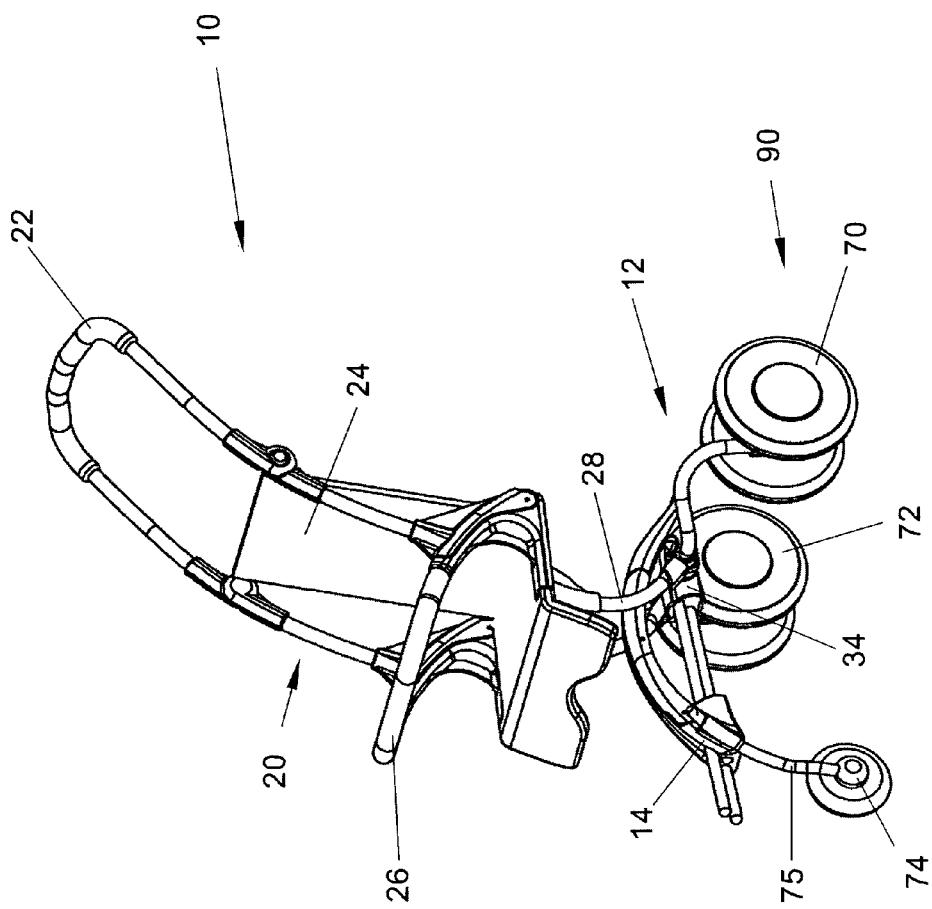
FIG. 1 is an illustration of a single stroller in accordance with a preferred embodiment of the present invention.

FIG. 1 is an illustration of a single stroller 10 in accordance with the present invention. The stroller is composed of a SSU 20 and a WAC 12 connected between them by poles or bars designated 28 (of swirling seat support unit 144, see FIG. 12A). The SSU is composed of a push-handle 22 a seat 24 and a sitting support-rail 26. The WAC is composed of an FWAS 14 and RWAS 34. Two pairs of relatively large side-wheels 70 and 72 are connected to both sides of the RWAS by a curved bar or pole 46 and 48 (seen in FIG. 2A). Each pair of wheels is connected to the end of the connection-bar by a pivot that enables to have the wheels in either a locked, pre-determined position or in freed position, allowing a full free circular movement. The angle of positioning of the wheels 70 and 72 depends on the desired state of connecting two strollers; the implication of which is clarified later in the text. The smaller wheel 74 is either a free swivel wheel or a wheel that can be altered between a free swirl wheel state and a locked, pre-determined position connected by an arm 75 to the FWAS. Further description of the construction of the WAC is given below in the description and explanation of FIG. 2.

Figure 2A:
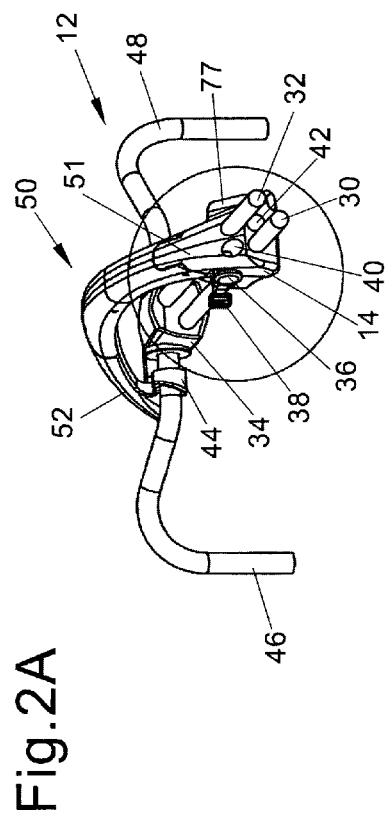
FIG. 2A is an illustration of a Wheels Assembly Construction (WAC) of an infant stroller in accordance with the present invention, as viewed from the front. The WAC is shown in a stretched state.
Figure 2B:
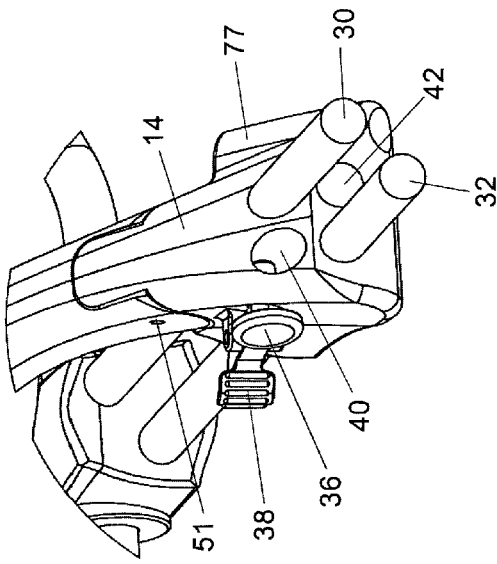
FIG. 2B is a detailed illustration of the frontal section of a WAC, as shown in FIG. 1, with a securing-pin in an opened state.
Figure 2C:
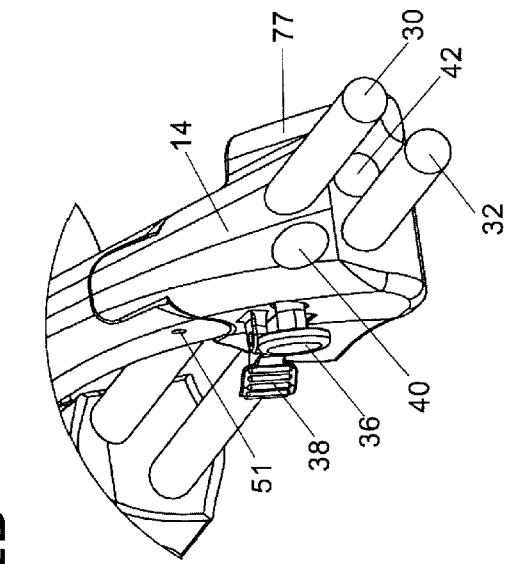
FIG. 2C is a detailed illustration of the frontal section of a WAC, as shown in FIG. 1, with a securing-pin in a closed state.
Figure 5:
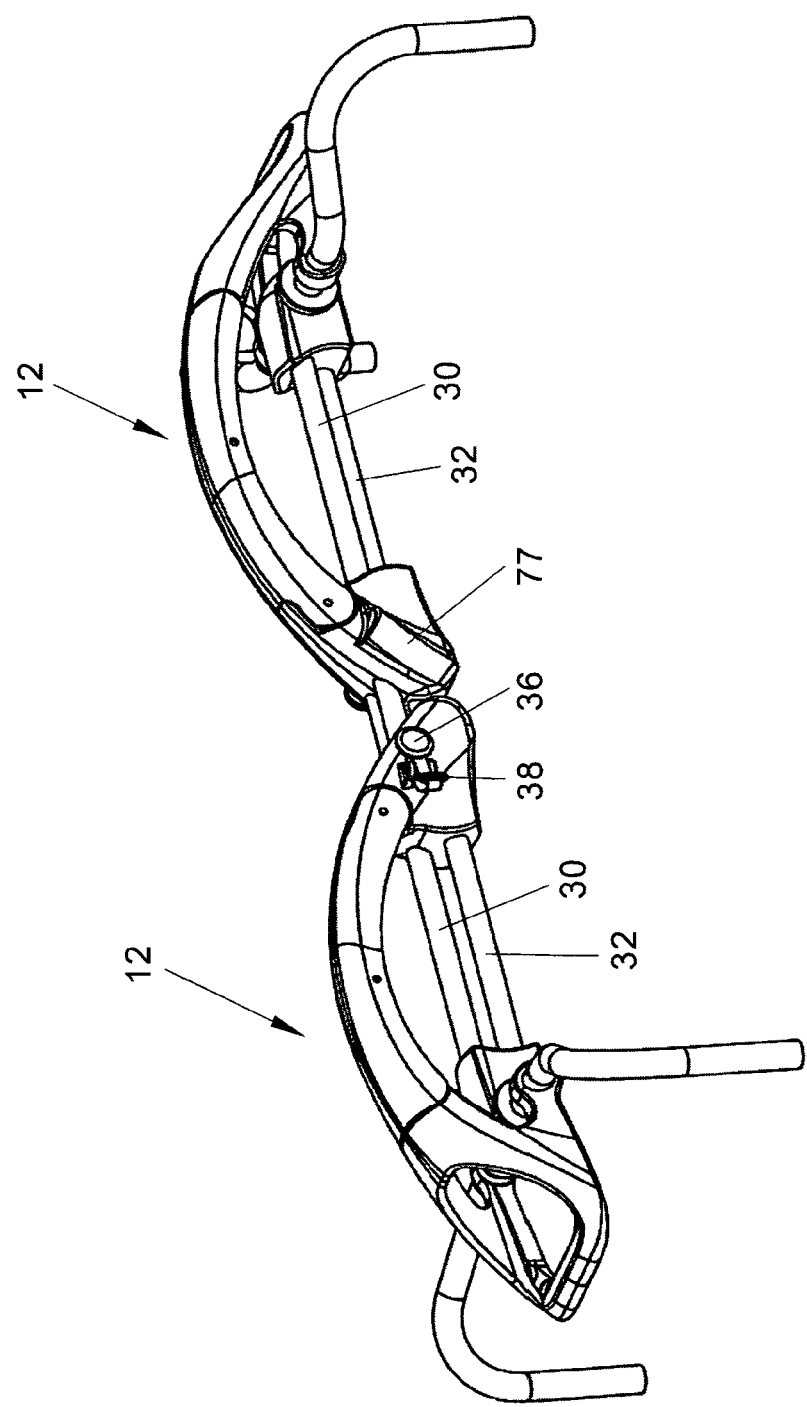
FIG. 5 is an illustration of two stretched-state WACs connected front to front.

FIG. 2A is detailed illustration of the WAC 12 viewed from the front. The WAC is composed of two parallel and diagonally running poles 30 and 32 rigidly connected at one end to a RWAS 34 and near the other end, running through, without being permanently fixed in place, to a FWAS 14. The FWAR has a securing-pin 36 on its vertical sidewall with an opened and closed positions and a release lever 38 for opening the securing-pin. On being closed the securing-pin locks rigidly in place the poles 30 and 32 of the adjacent stroller, running through the FWAR. Two bores run through the FWAS 40 and 42 parallel and diagonally to poles 30 and 32. The bores, seen more clearly in FIGS. 2B and 2C, are used for connecting two strollers to obtain a single stroller-unit by joining the WACs of the strollers. The connection mechanism is elaborated in FIG. 4 and FIG. 5, given later in the text. The FWAS and the RWAS are bridged by a segmented bar 50 connected by a hinge 51 to the FWAS and by bearing-rings 44 and 45 (45 seen in FIG. 3A) positioned around the two wheels-connector bars, 46 and 48, running perpendicular from both sides of the RWAS. Bar 50 terminates on the RWAS end with a foot-activator 52 that serves as a step-lever for the compaction of the WAC. The compacting mechanism of the WAC is clarified in FIG. 3A and FIG. 3B given below. The segments of bar 50 are connected by a pivot, designated 58, seen in FIGS. 3A and 3B.

FIG. 2B is a detailed illustration of the frontal section of a WAC, as shown in FIG. 1, with a securing-pin in the FWAS in an opened state.

FIG. 2C is a detailed illustration of the frontal section of a WAC, as shown in FIG. 1, with a securing-pin in the FWAS in a closed state.

To further clarify FIG. 2A, FIG. 3A is an illustration of a WAC 12 viewed from the rear and shown in a stretched state. FWAS 14 and RWAS 34 are bridged by a segmented bar 50 connected by a hinge 51 to the FWAS and by bearing-rings 44 and 45 positioned around two bars, 46 and 48, running perpendicular from both sides of the RWAS. Bar 50 terminates on the RWAS end with a protruding foot-activator 52 that serves as a step-lever for the compaction of the WAC.

FIG. 3B is an illustration of a WAC viewed from the rear, shown in a compact state. Compaction of the WAC is obtained by pushing the step-lever foot-activator 52 ground-wards. The movement of the step-lever to a vertical position causes the bar bridging the FWAS 14 to the RWAS 34 to fold at a hinge 58. The bar folding causes overlapping segments of the bar, 60 and 62, to disengage. With bar 50 folding FWAS is slid on the poles, 30 and 32, towards the RWAS till both units are in contact. With FWAS slid towards the RWAS the two polls protrude in a "bare" state. The compact state is elaborated in FIG. 6.

FIG. 4A is an illustration of two stretched-state WACs 12 placed in a front to front position prior to being to engaged with the poles of each WAC, 30 and 32, placed so as to fit into the bores 40 and 42 of the adjacent and matching WAC. The securing-pins 36 in the FWAS 14 of both WACs are opened automatically—pushed by the head of the adjacent stroller-inserting pole and close automatically when the secure pin meets the pole hole (by spring or by the elastic of the material-snap). A detailed illustration of the configuring of the poles 30 and 32, and bores 40 and 42 in a stretched state of a FWAS 14 shown in FIG. 4A is given in FIG. 4B. The securing-pins 36 of each of the FWAS, respectively, is inserted into hole, 19, in poles 30 of the adjacent stroller.

FIG. 5 is an illustration of two stretched-state WACs 12 connected front to front. Poles 30 and 32 of each WAC are inserted into the matching cavities 40 and 42 (seen in FIGS. 2A and 4B) in the adjacent WAC and the securing-pins 36 in both WAC in a locked state.

Figure 6:
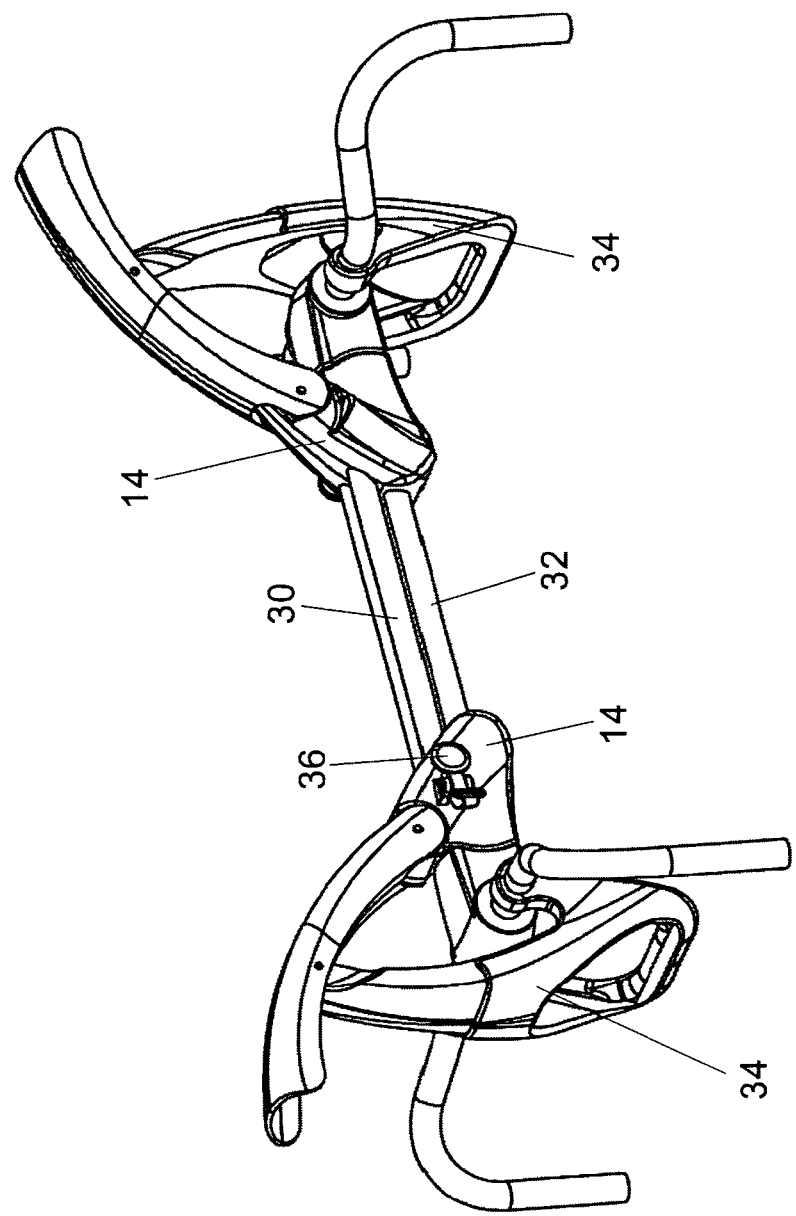
FIG. 6 is an illustration of two compact-state WACs connected front to front.

FIG. 6 is an illustration of two compact-state WACs engaged front to front. With the FWAS 14 and the RWAS 34 drawn close to each other in both WACs the poles 30 and 32 in each WAC are inserted into the cavities 40 and 42 (seen in FIGS. 2A and 4B) of the other WAC in a state that places the four poles in a fixed and tight parallel bundle.

Reversing the activities detailed above reverses the connection of compact-state strollers and reverses the compact state of each of the stroller. The bridging bar 50 is stretched by stepping on segment 62, illustrated in FIG. 3B, and the RWAS is distanced from FWAS by sliding on the polls 30 and 32. The polls 30 and 32 of each stroller are withdrawn from the cavities of the adjacent stroller, 40 and 42 after the releasing of the securing pins 36. In order to separate the strollers the securing pin is released and the strollers are pulled away from each other simultaneously.

Figure 7:
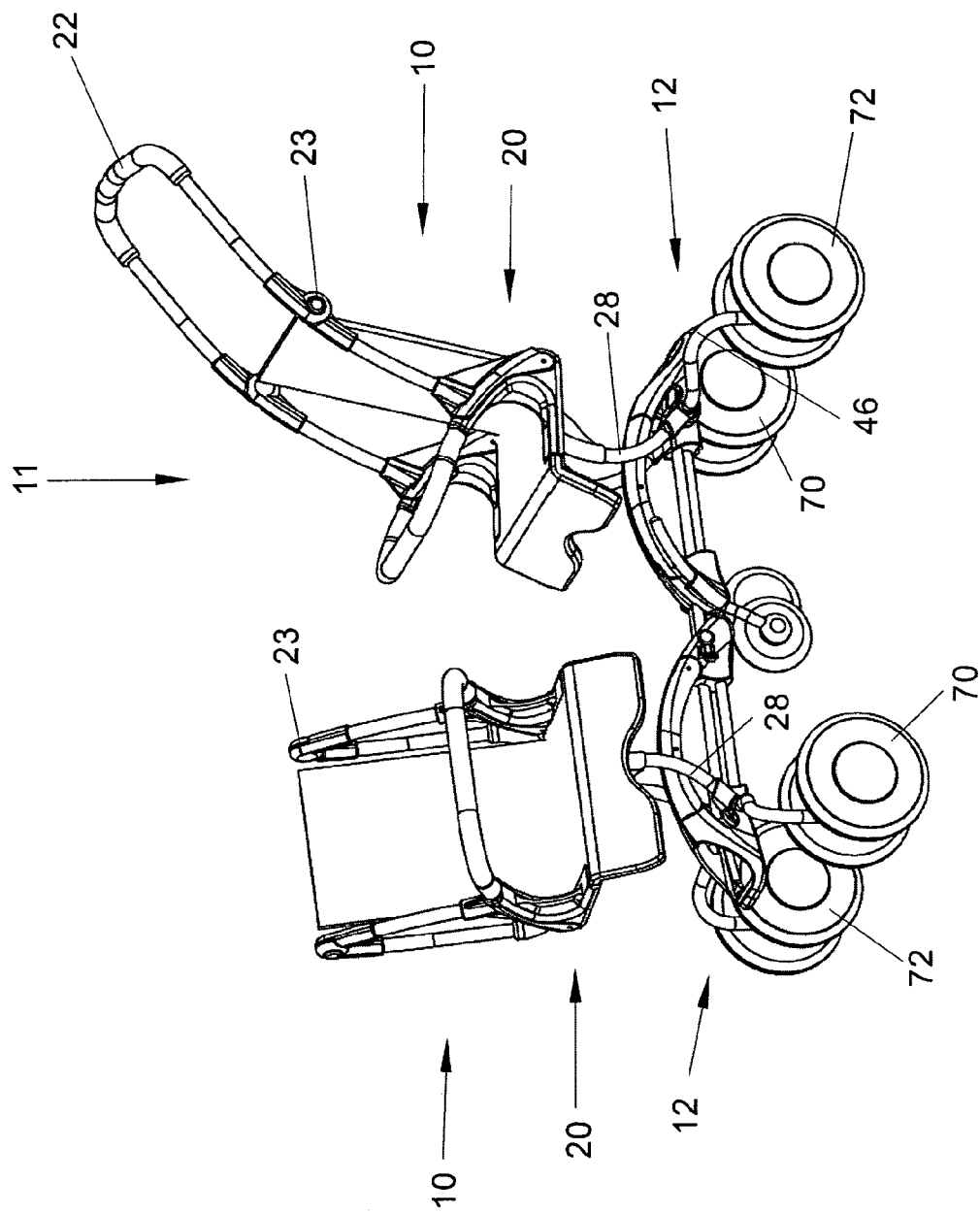
FIG. 7 is an illustration of two strollers in accordance to the present invention, connected in a stretched longitudinal train-state with the frontal seat swirled perpendicularly to the rear seat.

FIG. 7 is an illustration of two strollers 10 engaged in a stretched longitudinal train-state to form a single stroller-unit 11. The SSU 20 and the WAC 12 in each stroller are connected by vertical poles or bars 28 connected to the RWAS. Bar 28 connects to the RWAS by a ring around the wheel-axial bar, 46 and 48, as is further illustrated in FIG. 3A, FIG. 3B and FIG. 8. The connection of the SSU to the RWAS and the structure of the seat support section and its swirling ability are clarified in detail in FIG. 12A and FIG. 12B. The swirling of the seats enable a full circular motion with ability to fix the seats in 90 degree swirling increments, facilitating to seat two infants in either a facing position, a back-to-front position, a side by side position or in a perpendicular 90 degree angle sitting positions, as shown in the Figure. The push-handle 22 in the SSU can be folded by the aid of a pivot 23 on both sides of the handle, thus eliminating obstruction when two strollers are connected. The folding of the push-handle also assists in maneuvering with the stroller in a narrow and/or crowded location. When WAC are connected wheel 74 of each stroller is drawn near the FWAS by pulling the bar-arm connection 75 (see FIG. 1) through a position-fixing tube 77. The placement of the fixing tube 77 in the FWAS is shown in 2B, and 4B When two WAC are connected the side wheels 70 and 72 roll on the ground while the wheel 74 of both WAC are kept in an elevated position, not touching the ground. The side wheels 70 and 72 in the front, in the direction of movement, may be left to swirl freely while the side wheels at the back are fixed in place in the direction of movement. The ability to lock or fix the wheels in 90 degrees increments is elaborated in FIG. 11B.

Figure 8:
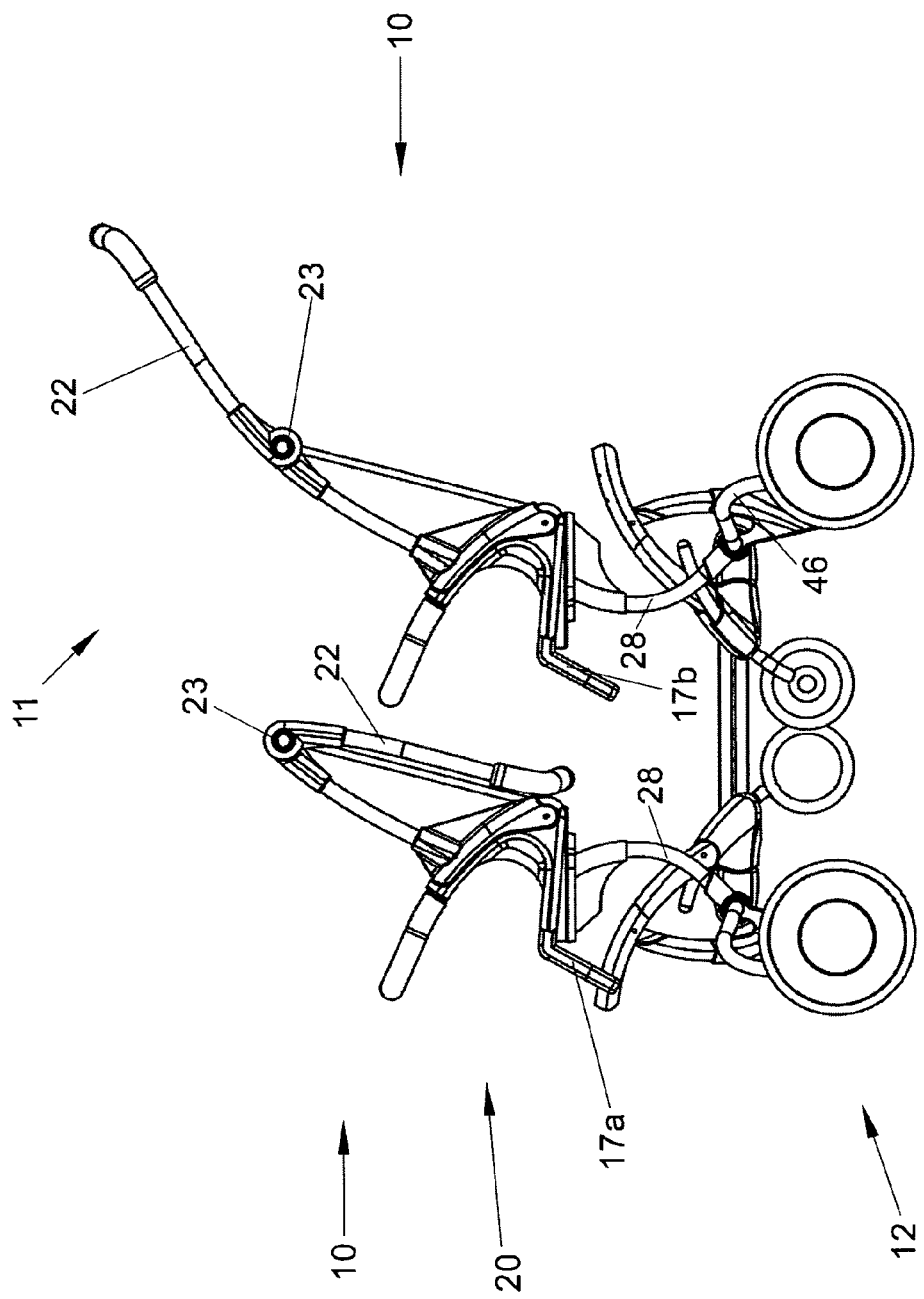
FIG. 8 is an illustration of two strollers in accordance to the present invention, connected in a compact longitudinal train-state.

FIG. 8 is an illustration of two strollers 10 connected in a compact longitudinal train-state to a single stroller unit 11. FIG. 8 illustrates the positioning of the two SSU of the strollers in closer vicinity than the positioning in stretched-state, as shown in FIG. 7, thus enabling easier maneuverability with the stroller-unit 10. A leg-rest (17a, 17b) is provided for supporting the legs of the infant sitting on the stroller, bearing in mind the fact that in the process of growing the legs become longer, rendering the leg-rest unnecessary, in which case it is folded away, leaving room for the longer legs (also see FIG. 15A).

Figure 9:
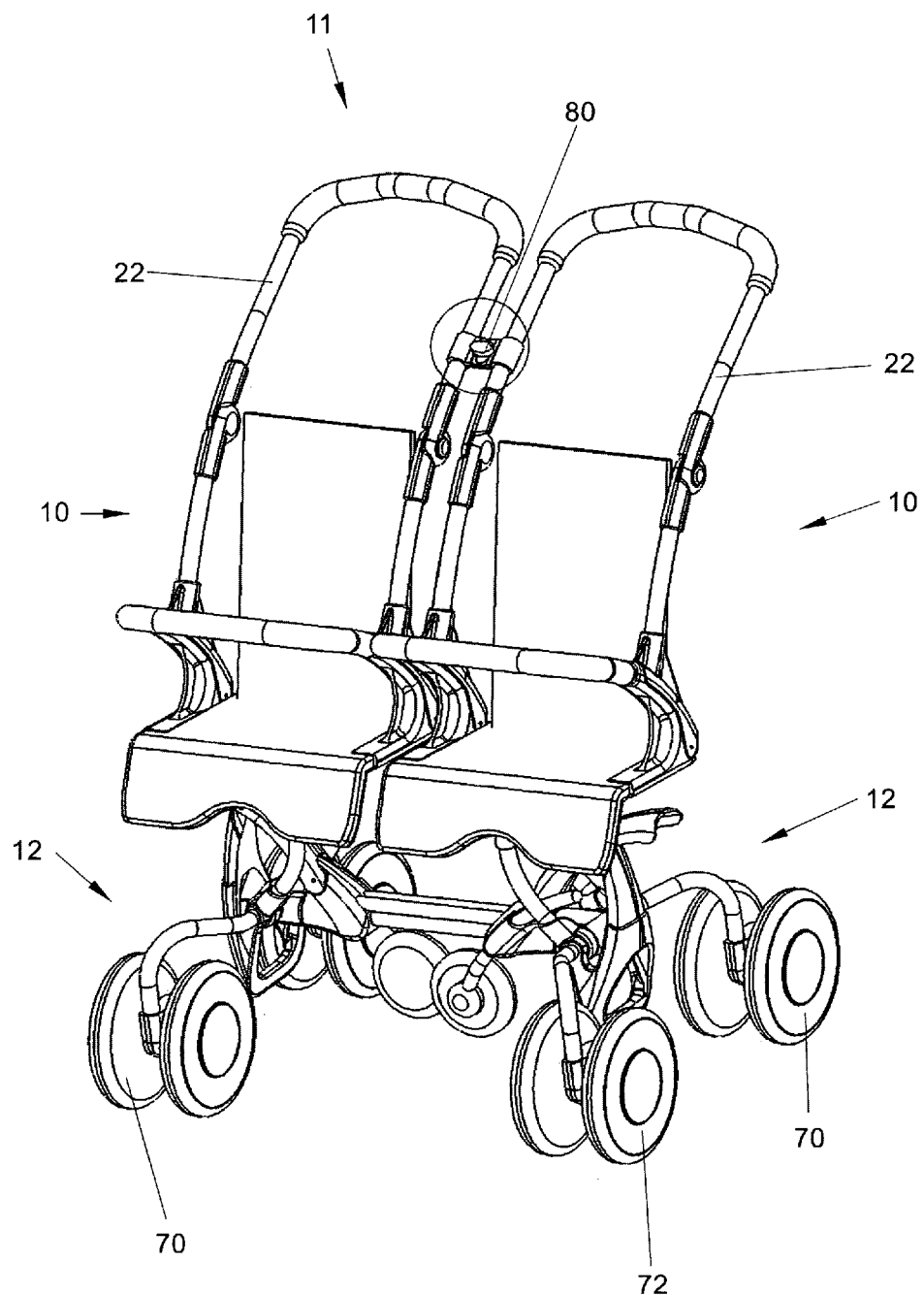
FIG. 9 is an illustration of two strollers in accordance to the present invention; connected in a side-by-side state.

FIG. 9 is an illustration of two strollers 10 connected in a side-by-side state to form a single stroller-unit 11. The WAC of the two strollers are connected in a compact-state, as illustrated in FIG. 6 and FIG. 8, and wheels 70 and 72 positioned in the breadth-direction of advancement of the stroller-unit 11. To improve the maneuverability of the stroller 11 in a side-by-side state, depending on circumstances, the frontal direction wheels and/or the back direction wheels of the connected strollers can either be pre-directionally fixed in place of left to be rotationally free to swirl in the advancing direction of movement. See bellow FIG. 11A and FIG. 11B for illustration and explanation of the wheels apparatus. The push-handles 22 of both strollers are connected by a bridging apparatus 80 illustrated in detail in FIGS. 10A, 10B and 10C. The mechanism of connecting the push-handles 22 can be of various constructions. The connection, as shown in FIG. 10A to FIG. 10C, is a typical example of such a connection mechanism.

Figure 10A:
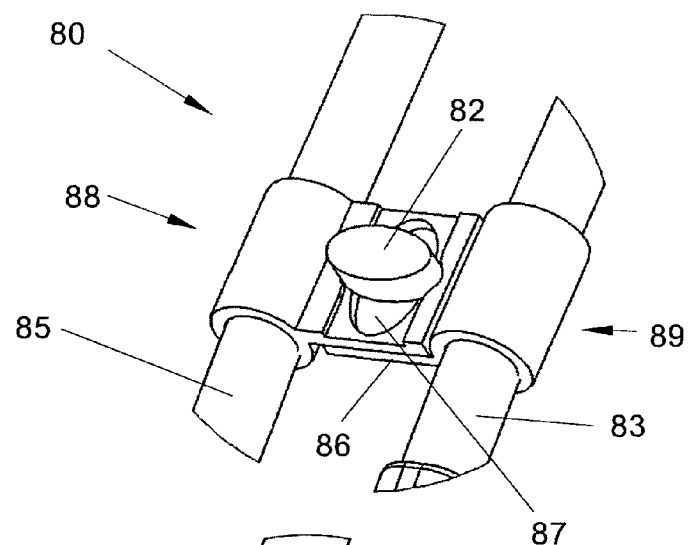
FIG. 10A is an illustration of an apparatus for connecting the push-handle of two strollers in accordance to the present invention in a locked position.
Figure 10B:
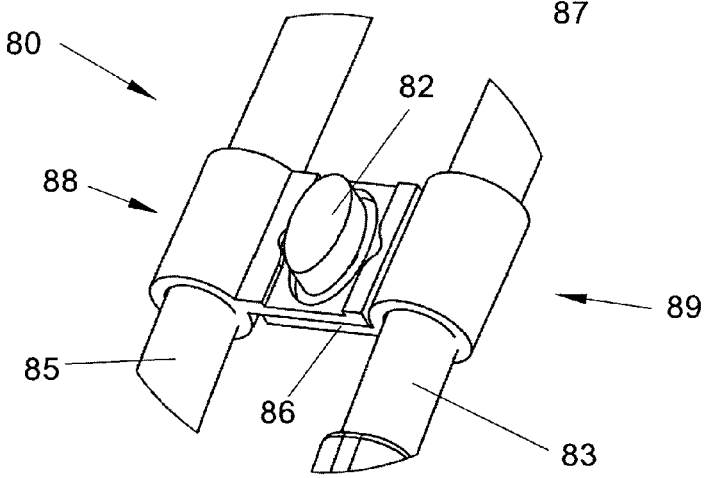
FIG. 10B is an illustration of an apparatus for connecting the push-handles of two strollers in accordance to the present invention in a semi-opened position.
Figure 10C:
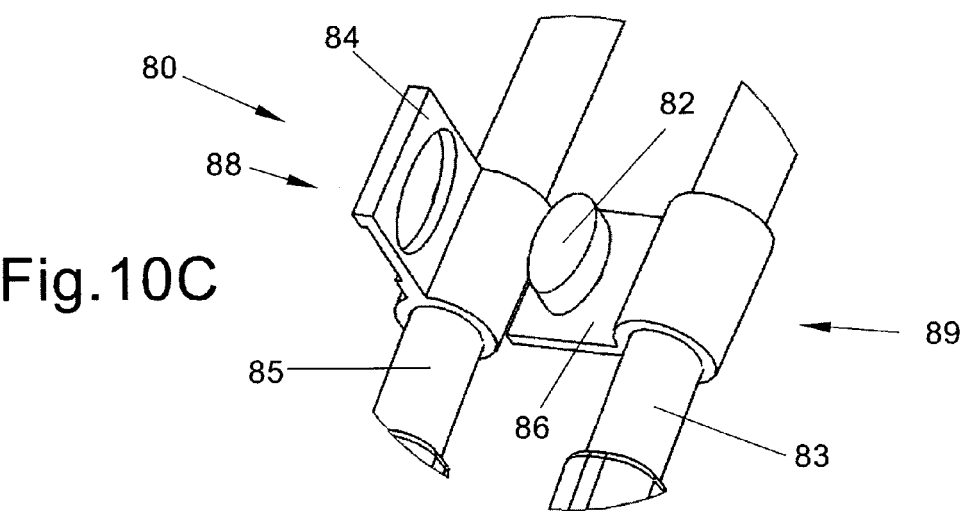
FIG. 10C is an illustration of an apparatus for connecting the push-handles of two strollers in accordance to the present invention in an opened position.

FIGS. 10A, 10B and 10C illustrate in a sequence the opening (or closing, if viewed from 10C to 10A) of the bridging apparatus 80 connecting the push-handles of two strollers, as shown in FIG. 9.

FIG. 10A is an illustration of an apparatus for connecting the push-handle of two strollers in a side-by-side state in accordance to the present invention in a locked position. Apparatus 80 comprises two units, 88 and 89 each positioned on another stroller. Each of the units is hinged by a tube that surrounds push-handle tubes 83 and 85, respectively, and has an extending plate 84 and 86 (shown in FIG. 10C). An elongated knob on a pivot 82, positioned on plate 86, is inserted into an elongated narrow cavity 87 in plate 84. By turning the knob by 90 degrees it can no longer exit the cavity and plates 86 and 84 are interlocked.

FIG. 10B is an illustration of an apparatus for connecting the push-handle of two strollers in a semi-opened position. The knob 82 is turned to be aligned with the narrow cavity 87.

FIG. 10C is an illustration of an apparatus for connecting the push-handle of two strollers in accordance to the present invention in an opened position. Knob 82 is turned and aligned with the narrow cavity 87. Plate 84 is swirled upwards around tube 85 and liberates the knob 82. Plate 86 is swirled downwards and the push-handles of the two strollers are disengaged.

Figure 11A:
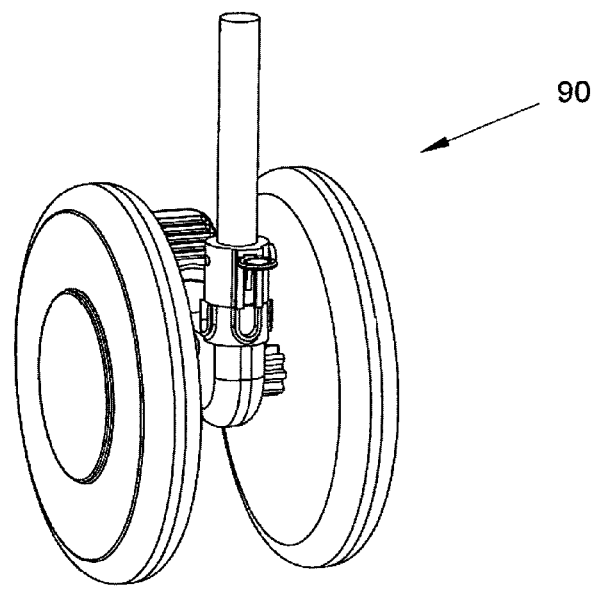
FIG. 11A is an illustration of an assembled swirl-wheel apparatus used in a stroller in accordance to the present invention.

FIG. 11A is an illustration of an assembled swirl-wheel apparatus used in a stroller in accordance to the present invention. The connection of a swirl-wheel apparatus 90 in both of the large wheel pairs in the RWAS is illustrated in FIG. 1.

Figure 11B:
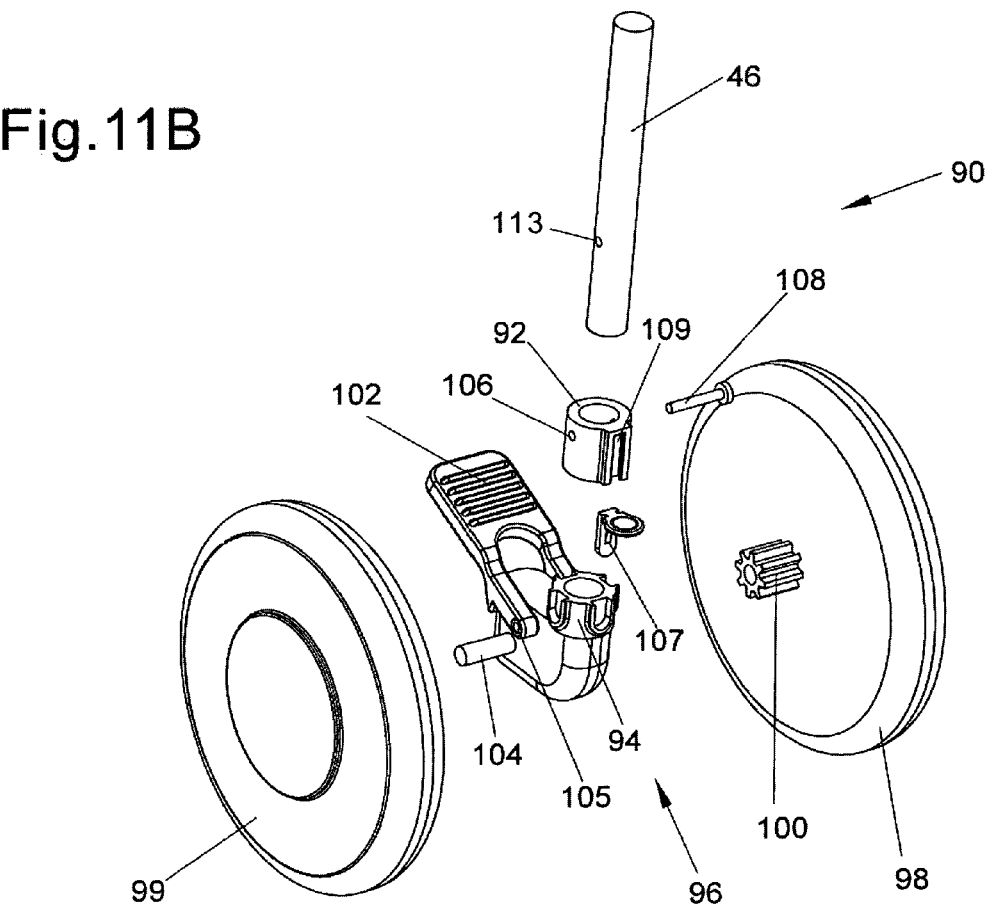
FIG. 11B is an illustration of a disassembled swirl-wheel apparatus used in a stroller in accordance to the present invention.

FIG. 11B is an illustration of a disassembled swirl-wheel apparatus 90, shown in FIG. 11A. Bar or pole 46 and 48 of the RWAS, as illustrated in FIGS. 3A and 3B are each inserted into ring fixture 92 which is mounted on a protruding tube 94 extending from an axial-block 96. Ring 92 has a hollow hole 106 running through it and a framed slit on its side 109 opened at the bottom. The protruding tube 94 has four equally circumference-spaced vertically framed slits that have the exact width of the slit on tube 92. A rectangular plate 107 with a handle-ring is inserted trough the slit on ring 92 and into one of the four slits of the protruding tube 94. The slit of choice in the protruding tube determines the connection-direction of the wheels in 90-degree increments. If the rectangular plate is not inserted into the protruding tube 94 the wheels are free to swirl around pole 46, with no pre-determined orientation. On insertion of the plate 106 the angle of the wheels in respect to the RWAS is determined. A securing-pin 108 is inserted trough the ring 92 and through hole 113 in bar or pole 46 of the RWAS, thus connecting and fixing the swirl-wheel apparatus 90 to the RWAS. A pair of cogwheels 100 (only one seen in the figure) connects to the axially center of the internal facing side of the pair of wheels 98 and 99. A stop-paddle is pivotally connected (105) to the axial-block and has protruding bulges that, on lowering the paddle, insert amongst the cogs of the cogwheels 100 and the stroller comes to a stop.

Figure 12A:
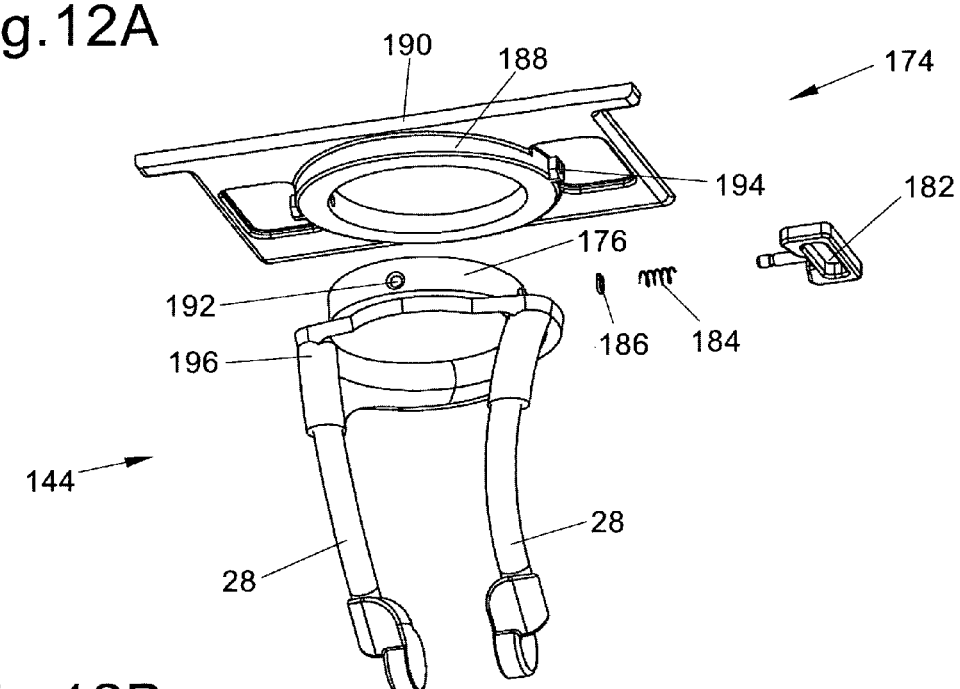
FIG. 12A is a detailed illustration of the components of the seat apparatus shown in FIG. 8 and FIG. 9.

FIG. 12A is a detailed illustration of some of the components of the Seat Support Unit: SSU designated 20 in FIG. 1. The seat-connection apparatus comprises a seat-base unit 174 and a swirling-seat-support unit 144. The seat-support unit comprises a ring frame 176 positioned horizontally and connected by protruding platform-plates 196 to two vertical support bars 28 that connect to the RWAS. The ring frame 176 has four evenly spaced horizontal holes 192 in the circumference running horizontally through the middle of the wall of the ring. A securing-pin with a handle 182, having a spring 184 and a screw nut 186 are provided for securing the seat-base unit in place in the seat-support unit. The seat-base unit 174 comprises a ring 188 that fits and "wraps around" the circumference of the seat-base unit 144 and protrudes from a plate 190 in which the ring is embedded. The seat-support ring 188 has horizontal two holes in the circumference running horizontally through the middle of the wall of the ring placed across from each other and both fit to align with the holes of the seat-support frame ring 176. The locking and securing of the swirl seat-support unit 144 to the seat-base unit 174 is done by inserting the securing-pin 182 through one of the holes, designated 194, in the "wrapping" ring 188 and through an aligned hole in the "Wrapped" 176. The decision which of the holes in ring 176 will be aligned with the insertion hole in ring 188 determines the direction positioning of the seat-base unit 174 of the swirl-seat support unit. In connecting the seat-base unit 174 with the seat support unit 144, spring 184 is compacted and keeps the securing-pin 182 in tension so that when hole 194 is aligned with hole 192 by the swirling of ring 188, the securing-pin will be automatically inserted into 192 by the power of the spring. Spring 184 is connected to nut 186, so that when pin 182 is drawn out from the hole spring 184 pulls the pin inwardly, so that when the pin is in front of a hole the pin locks the seat in position.

Figure 12B:
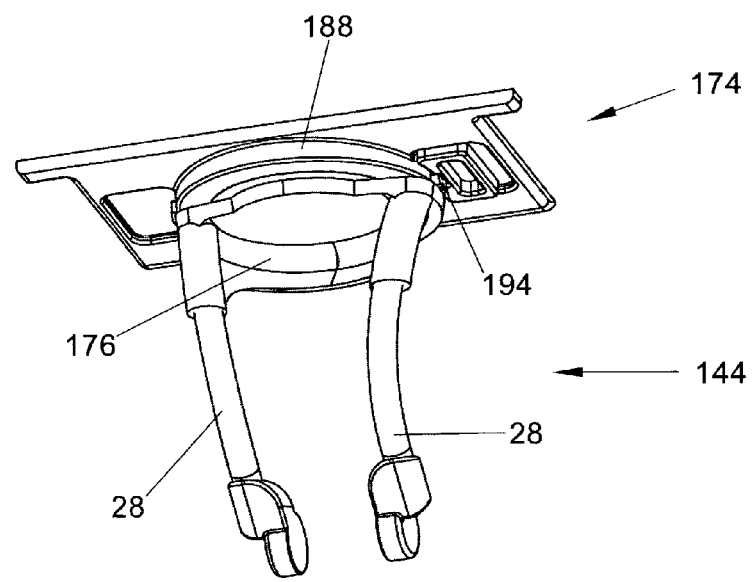
FIG. 12B is a detailed illustration of an assembled seat apparatus shown in FIG. 8 and FIG. 9.

FIG. 12B is a detailed illustration of an assembled seat-connection apparatus whose components are shown in FIG. 12A.

Another embodiment of the present invention is an easy and comfortable connection of two not identically composed strollers, shown in FIG. 13 through FIG. 17B

Figure 13:
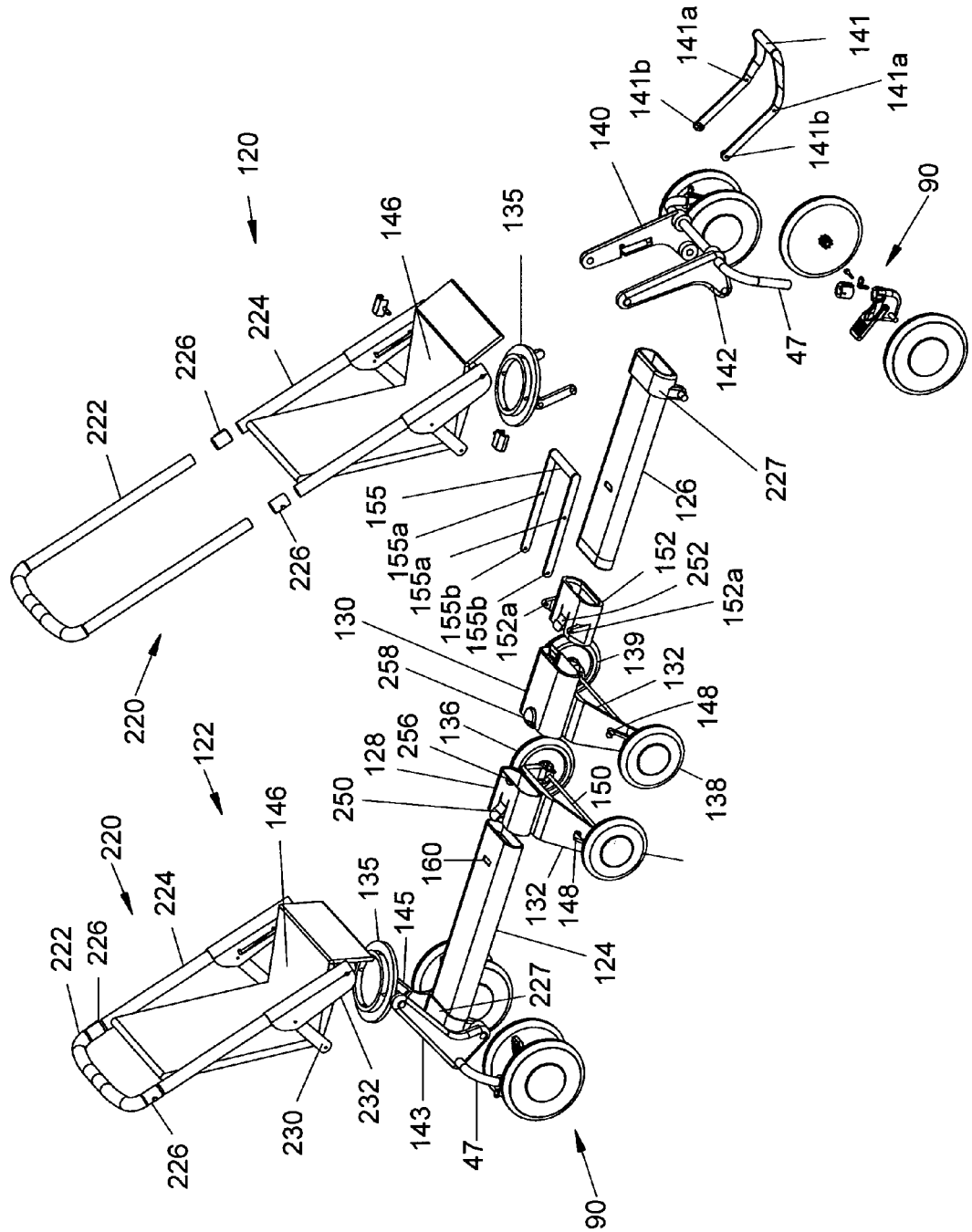
FIG. 13 is a detailed illustration of two not identical strollers positioned to be connected in a longitudinal train-state.

FIG. 13 is an illustration of two disassembled strollers, designated 120 and 122, having different compositions in a position to be engaged in a longitudinal train-state. For a better understanding FIG. 13 should be viewed together with FIG. 14. Stroller 122 comprises a hollow bar 124, encompassed on one end by sliding ring-bar 128 and on the other end having two "L"-shaped plates, designated 143 and 145, that protrude vertically on both sides of bar 124. The "L"-shaped plates are pivotally connected to connector 227 on bar 124 and wheel axis designated 47. The sliding ring bar 128 has a reversible snapping mechanism 250 that snaps into bar 124 and locks ring bar into place on bar 124. On releasing the snapping the sliding bar is free to move. Sliding ring bar 128 has two flanks 132 running diagonally downward in both side-directions. Wheels 134, 136, are connected by connecting-support bar 150, which can be locked in an engaged lower position or raised to a disengaged position through slots 148 of each flank and (see FIG. 14 for elaboration). The wheels can be folded and lifted upward, towards bars 124 pulling and changing the state of the support bar 150 in slot 148. Stroller 120 comprises a hollow bar 126, encompassed on one end by sliding ring-bar 130 adjacent to a sliding ring bar 152 and having on the other end having two "L"-shaped plates, designated 142 and 140, that protrude vertically on both sides of bar 126. The sliding ring bar 152 has a reversible snapping mechanism 252 that snaps into bar 126 and to sliding bar 130, locking the ring bar into place on bar 126. On half releasing the snapping the sliding bar is free to move connected sliding bar ring 152. Full releasing, allows removing the sliding bar 130 with the connected wheels 138,139 (the wheels of the other stroller can also be removed similarly). A "U" shaped bar 141 is pivotally connected at 141*a* to the axis points of connector 227 and points 141*b* are connected to connection points 155*a* of "U" shaped bar 155. Points 155*b* of "U" shaped bar 155 are connected to connecting points 152*a* of sliding ring bar 152 (see FIG. 14 for further clarification). By stepping down on bar 141 sliding bars 152 and 130 slide along bar 126 towards the "L"-shaped plates and bar 155 rises vertically from bar 126, so that the two strollers are drawn together to a compact state. In order to return to the stretched position bar 155 is activated, forcing the compacting mechanism back.

The "L" plates 140 and 142 of stroller 120 and plates 143 and 145 of stroller 122 are pivotally connected to connector 227 of bar 126 (and similarly to bar 124).

Curved bar 47 is perpendicularly and fixedly connected to the corners of the "L" shaped plates, 140 and 142. The bar runs through the "L" plates and has swirl wheel mechanisms 90 connected at both ends. The swirl wheel mechanism 90, as clarified in FIG. 11B, can be fixed at different angles.

Sliding ring bar 130 has two flanks 132 running diagonally downward in both side-directions. Wheels 138, 140, are connected to the bottom end of the flanks by a slot 148 (better seen in FIG. 14) and the flanks of each two wheels are held rigidly in place by a connecting-support bar 150 engaging the two flanks (see illustrated in FIG. 14 of elaboration). The wheels can be folded and lifted upward, towards bars 124 pulling and changing the state of the support bar 150.

To connect stroller 120 to stroller 122, sliding ring bar 128 is connected to sliding bar 130 using reversible locking mechanism (protruding snap pin 256 on bar 128 and catcher 258 on bar 130). The reversible snapping mechanism 252 and snap 250 (on sliding ring bar 128) are released from bar 124 and 126. Bar 126 is inserted into bar 124 and simultaneously, bar 124 is inserted into sliding bar 130 and sliding bar 152. When bar 124 reaches inside sliding bar 152, the reversible snapping mechanism 252 locks it in position. The wheels 134, 136 of stroller 122 and wheels 138, 139 of stroller 120 can be disengaged by raising them.

The sliding ring bars 128 and 130 of strollers 122 and 120, respectively, that support the wheels, can be individually of both removed when connecting the two strollers 120 and 122, leaving four ground rolling wheel-units without additional suspended wheels. The "L" plates (140, 142 in stroller 120 and 143, 145 in stroller 122) in both strollers support on the top a swirling seat-connection unit 135, which supports a seat 146. The push-handles 220 of the strollers, 120 and 122, comprise of folded open-ended rectangle bar 222 that can be either stretched or inserted, at will, through connection tubes 226 and into receiving tubes 224, fixed on both sides of the seat 146. See FIG. 14 for the stretched and compacted states of the push-handles.

The seat 146 has either an opened, "seatable" state or a folded, compacted state. To understand the transition from one state to the other FIGS. 13, 14A, 14B, 17A and 17B should be viewed. When in an opened position bar 232 is locked at an angel of about 45 degrees by bar 230, which is pivotally connected to the seat 146. Bar 232, on both sides of the seat, holds the push-handles 220 in an upright "pushable" angle. When folding the seat, a securing pin protruding from opposite sides of the seat, and which resides inside groove 232a of bar 232 (bars 232 are symmetrical) is disengaged so that the groove is allowed to slide over it until bars 230 and 232 are aligned in a horizontal position.

To fully fold and compact the stroller (stroller 120) the "L" shaped plates 140 and 142 are folded. See FIG. 17A and FIG. 17B for further clarification.

Figure 14:
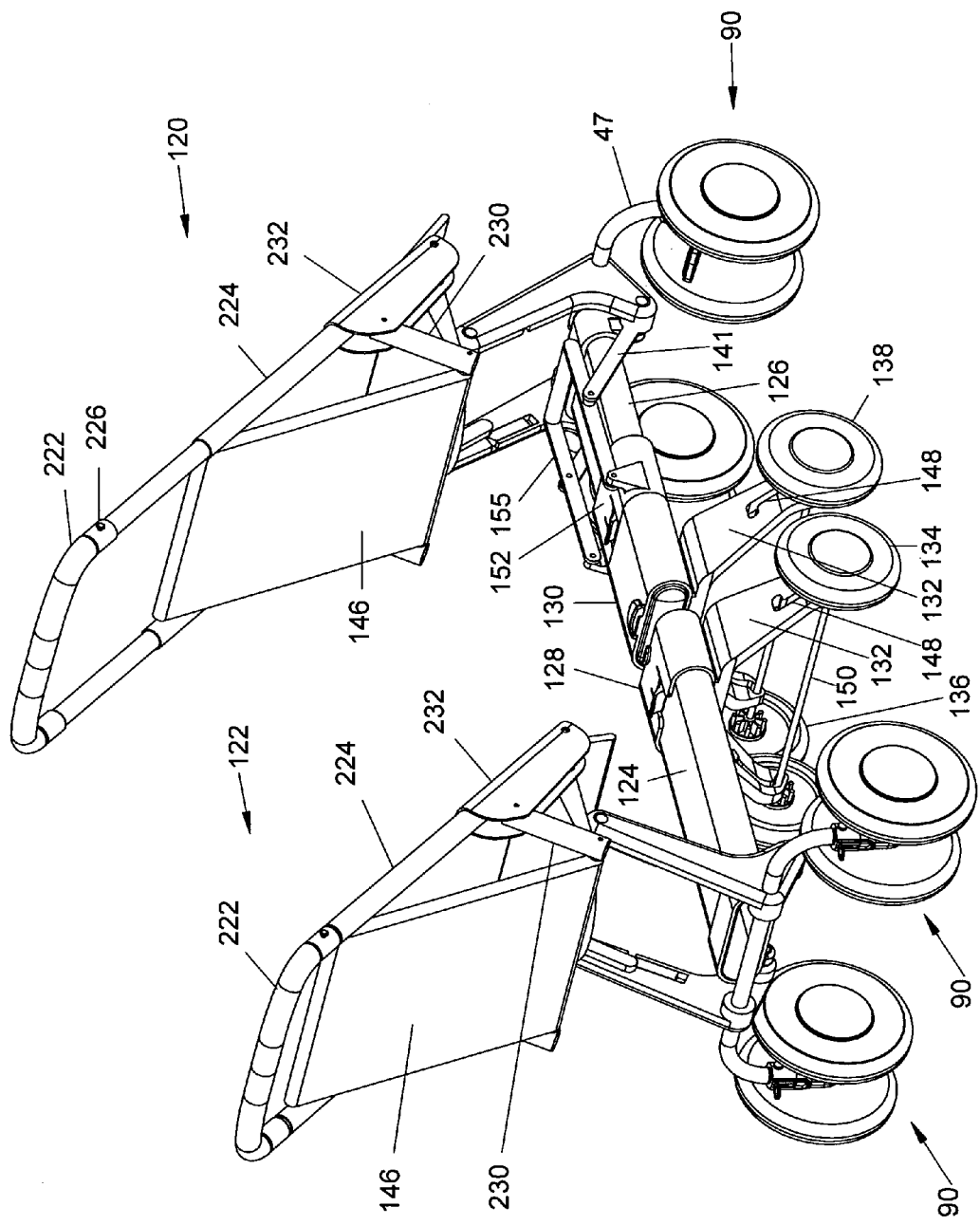
FIG. 14 is an illustration of the components of two not identical strollers, positioned to be connected in a longitudinal train-state.
Figure 15A:
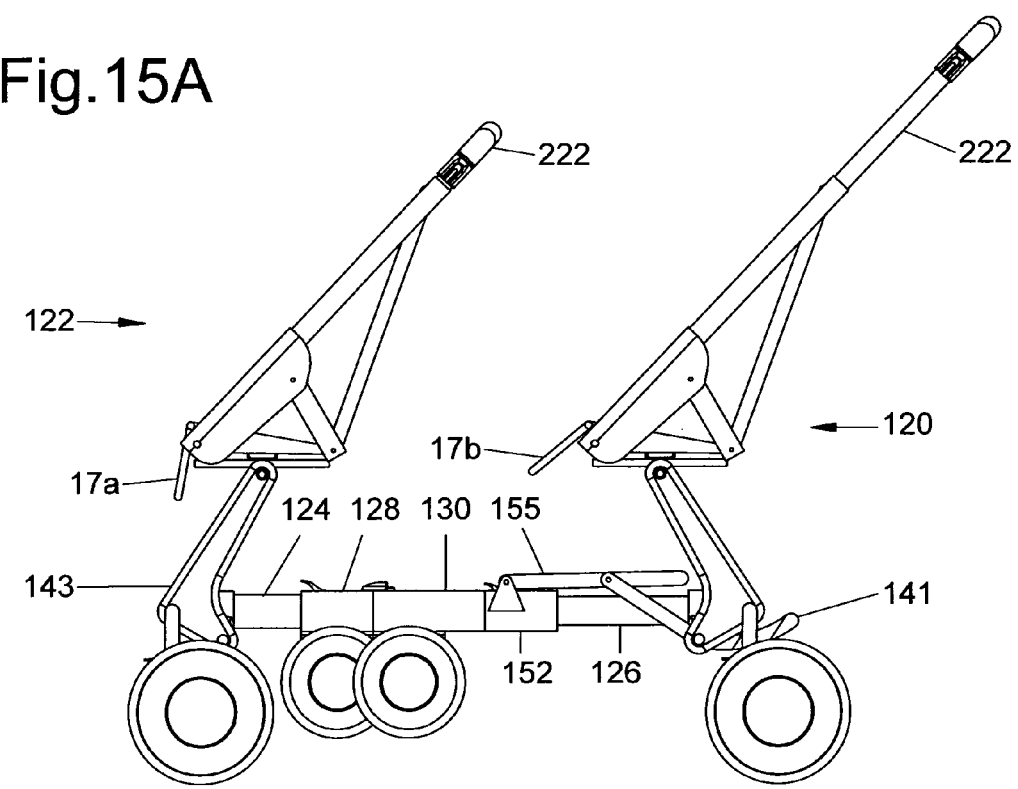
FIG. 15A is an illustration of two not identical strollers connected in a stretched longitudinal train-state.
Figure 15B:
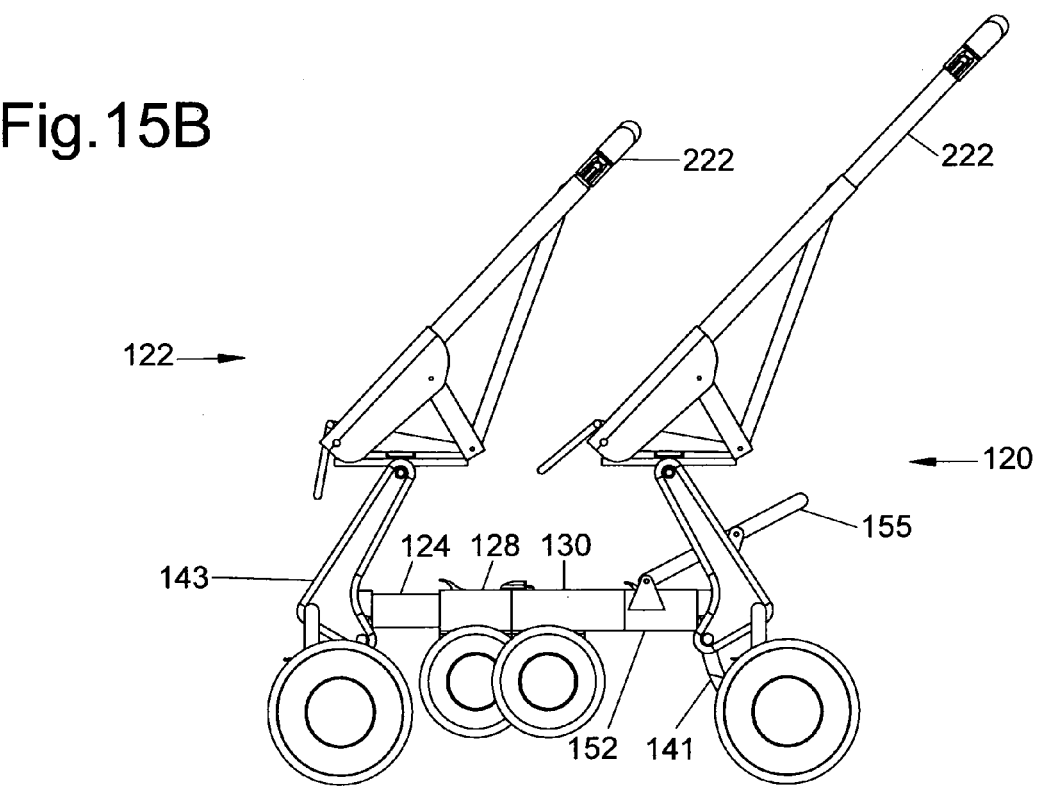
FIG. 15B is an illustration of two not identical strollers connected in a compact longitudinal train-state.

FIG. 14 is a detailed illustration of two strollers 120 and 122 positioned to be joined together in a longitudinal train-state. FIG. 14 should be viewed in conjunction with FIG. 15A and FIG. 15B. Stretched state joining of the two strollers is illustrated in FIG. 15A, a compact joining of the strollers is given in FIG. 15B.

Disengaging of the two strollers, 120 and 122, is done by reversing the activities described above for the joining of the strollers.

Figure 16:
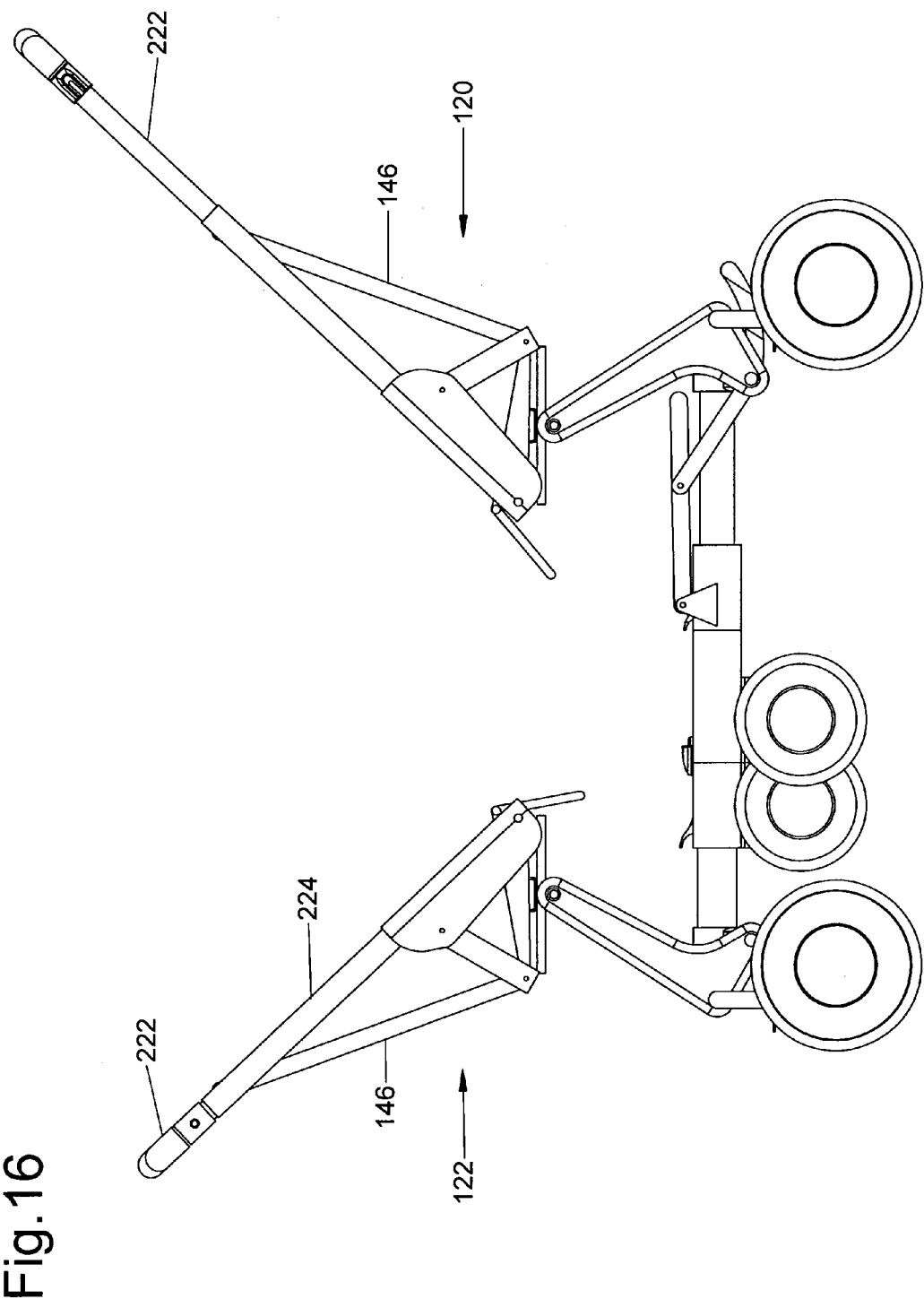
FIG. 16 is an illustration of two not identical strollers connected in a stretched longitudinal train-state with the seats facing each other.

FIG. 16 is an illustration of two strollers 120 and 122 joined in a stretched longitudinal train-state with the seats facing each other. The changing of the angles of the seats 146 is obtained by changing the relative angle of the swirl-seat 146 in respect to the swirling seat-connection unit 135, seen in FIG. 13.

Figure 17B:
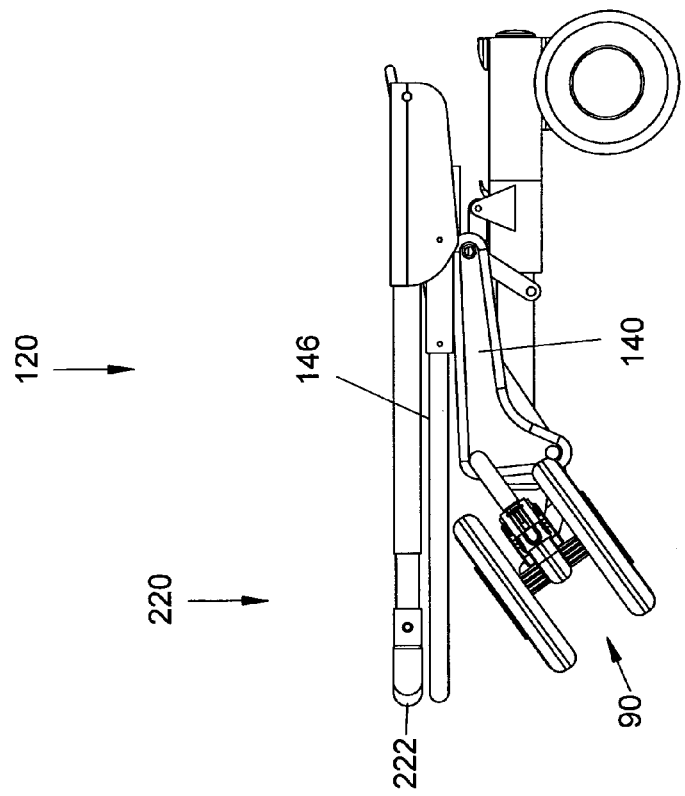
FIG. 17B is a side-view illustration of the stroller in FIG. 17A in a folded and minimized state.
Figure 17A:
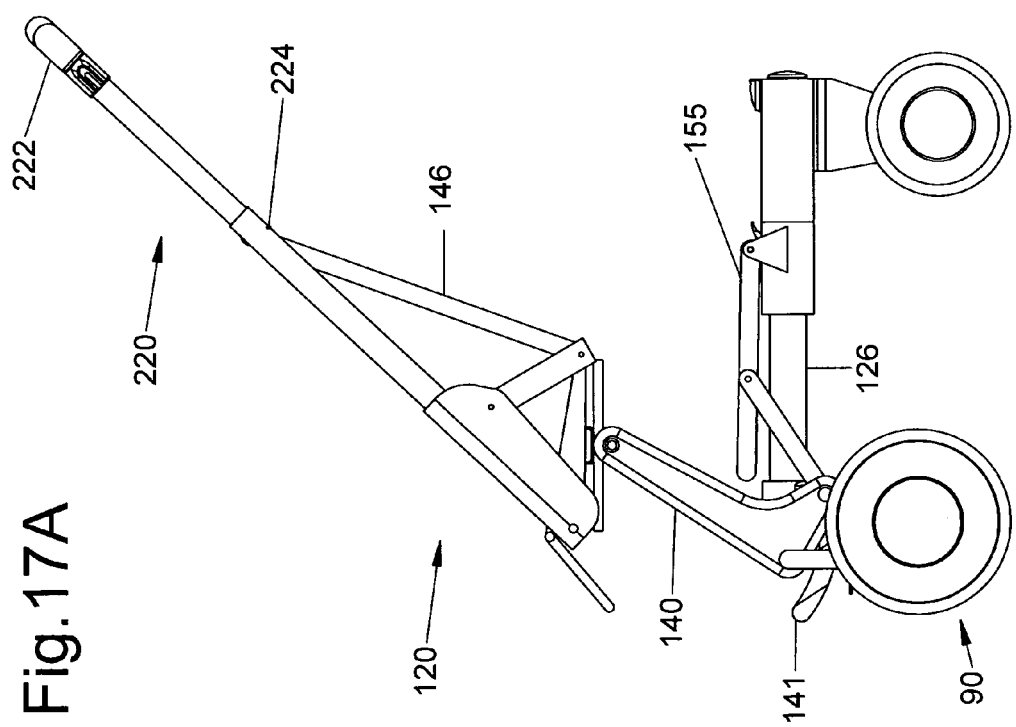
FIG. 17A is a side-view illustration of a single, compactable stroller, as shown in FIG. 14 in an assembled and ready to be rolled state.

FIG. 17A is a side-view illustration of stroller 120, shown disassembled in FIG. 13 and assembled in FIG. 14. The stroller is illustrated in stretched state and ready for use.

FIG. 17B is a side-view illustration of one of the stroller 120 shown in FIG. 13 and in FIG. 14 in a folded and minimized state. Wheel 90 is raised and reoriented sideways, reducing the overall profile of the folded stroller. The seat and the push handles are horizontally aligned.

Figure 17C:
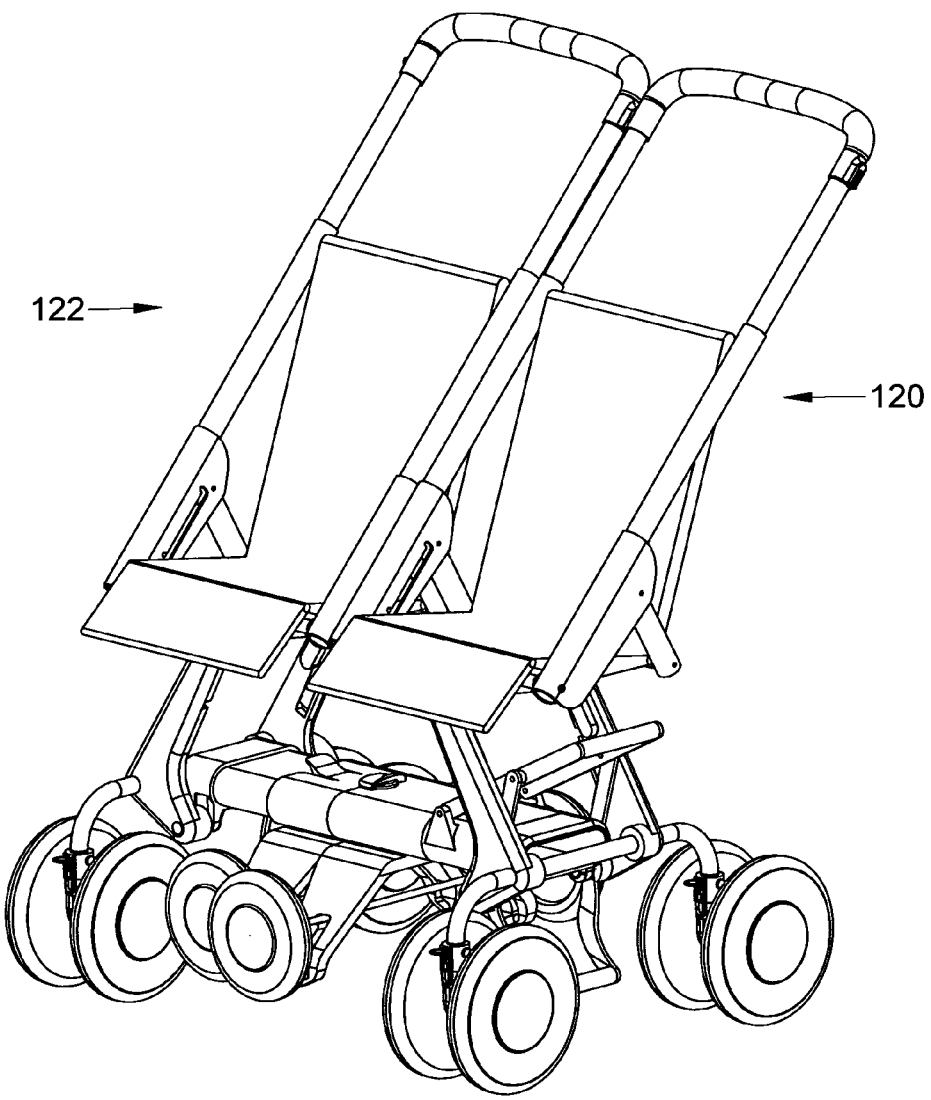
FIG. 17C is an illustration of the components of two not identical strollers, connected in a side-by-side configuration.
Figure 18:
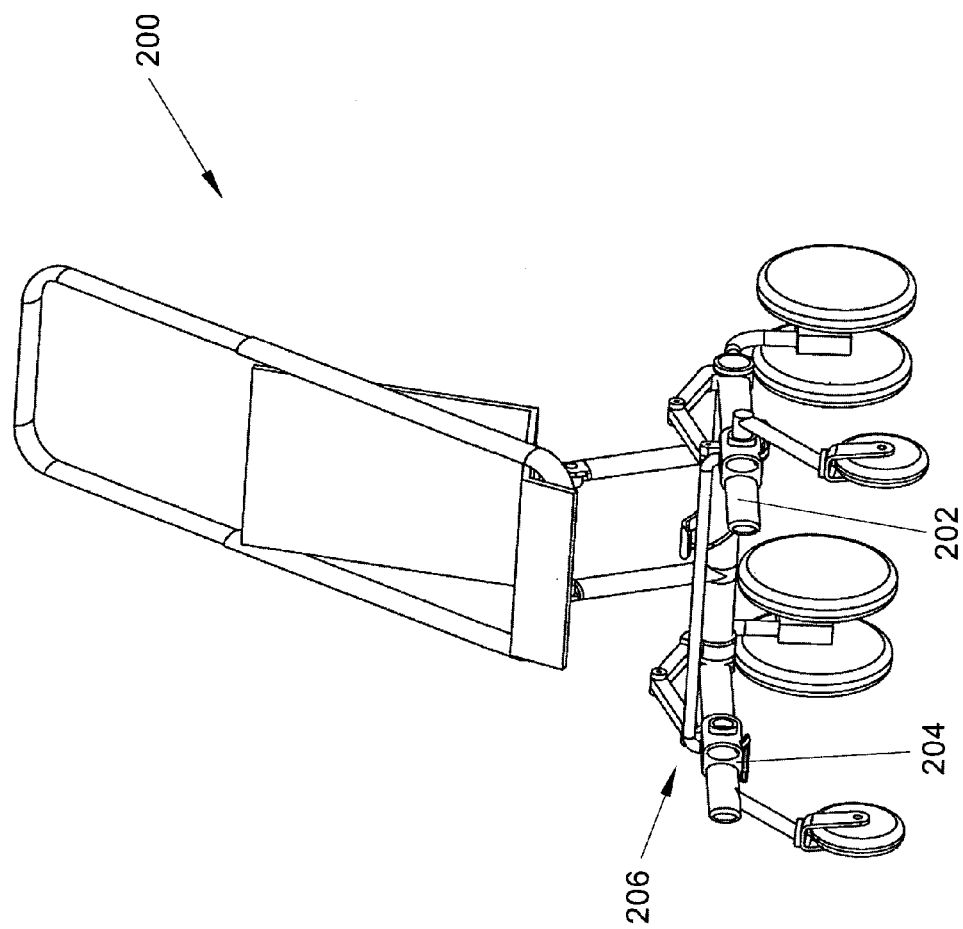
FIG. 18 is an illustration of a single stroller with a wheels axial-structure with a two parallel-bars assembly.
Figure 19:
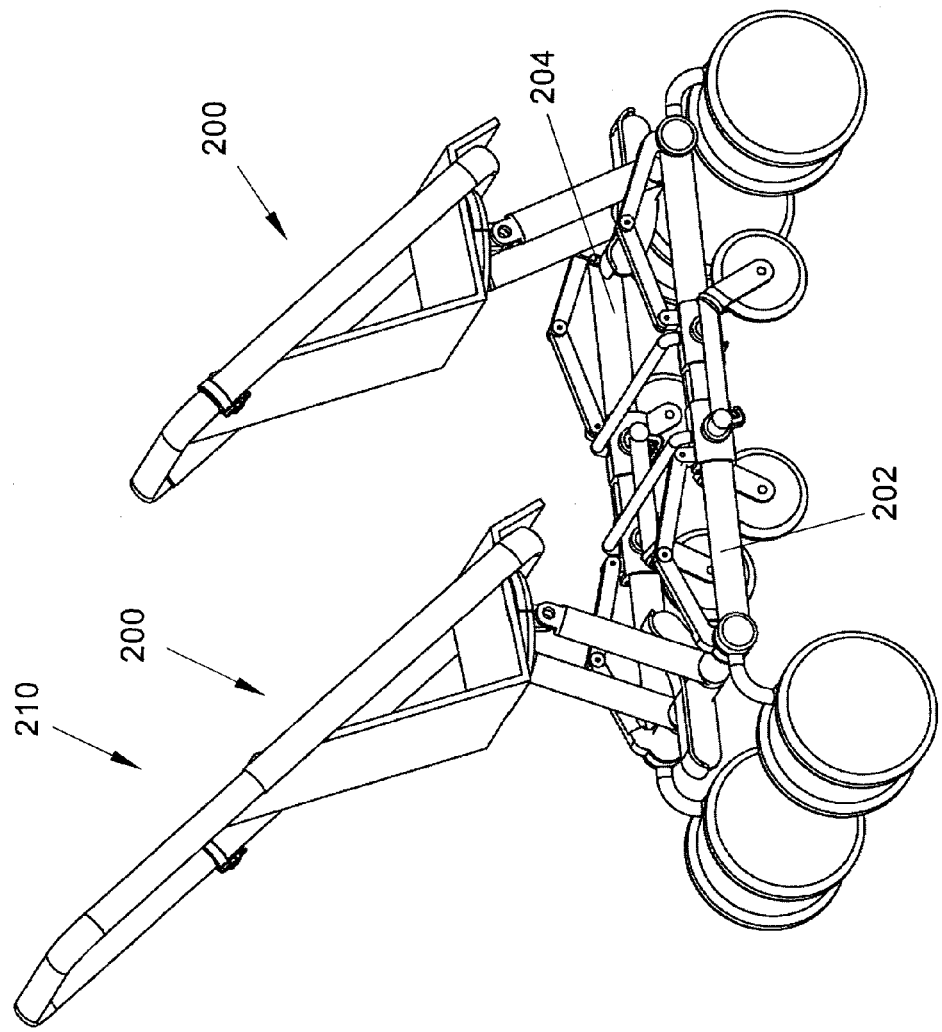
FIG. 19 is an illustration of two connected strollers as shown in FIG. 18, in a longitudinal train-state.

FIG. 17C is an illustration of the components of two not identical strollers, connected in a side-by-side configuration Another embodiment of a stroller that can connect to form a multi-seat stroller, in accordance to the present invention, is given in FIG. 18 and FIG. 19.

FIG. 18 is an illustration of a single stroller 200 with a two parallel-bars wheels axial-structure 206. The axial-structure 206 is designed two parallel bars 202 and 204. The bars enable two independent strollers 200 to be connected and form a single stroller state, as seen in FIG. 19.

FIG. 19 is an illustration of two connected strollers 200 as seen in FIG. 18, forming a single stroller state 210. The connection of the strollers is done by the attachment of the parallel bars of both strollers.

The present invention introduces a novel design for strollers, allowing connecting two strollers in a side-by-side and alternatively in train configuration. At the same time, in some preferred embodiments of the present invention the joined strollers can be compacted offering greater maneuverability and comfort.

Conveniently, the two joined strollers can be easily disengaged and used separately.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A stroller device comprising at least two carriages connected together, wherein both carriages comprise:
   a support unit comprising a seat and a push handle connected to the seat,
   a wheels assembly rotatably coupled to the support unit, wherein the wheels assembly comprises two rear wheels and a frontal wheel axial structure on the front of the wheels assembly, wherein the frontal wheel axial structure comprises at least one front wheel, wherein each wheel is a swivel wheel capable of swiveling about a vertical axis and can be locked in four incremental 90 degree orientations the vertical axis;
   an engagement element for engaging the carriage to the other carriage of said at least two carriages, wherein the engagement element connects the carriages with the frontal wheel axial structures in a front to front position;
   a pivoting element coupled to the support unit allowing rotating the support unit, and
   a locking member capable of locking the support unit in perpendicular positions with respect to the wheels assembly, facilitating the support unit to be rotatably reoriented so as to allow transporting the stroller device such that the support unit of the carriage and the other support unit of the other carriage can be aligned in a train state wherein one of the carriages is behind the other carriage based upon the direction of motion of the stroller device and alternatively in a side-by-side state wherein where the seats are positioned in parallel to the direction of advancing with the handles behind each seat without disconnecting the carriages.

2. The device as claimed in claim 1, wherein the engagement element comprises at least one bar protruding forward from the front of the wheels assembly and a connector adjacent the bar provided with a bore for receiving a matching bar of the other carriage.

3. The device as claimed in claim 1, wherein the engagement element comprises a hollow bar with an opening into which a matching bar of the other stroller may be inserted.

4. The device as claimed in claim 1, wherein the stroller device has a folded configuration for storing the device and an unfolded configuration for using the stroller device to transport a child and the stroller device further comprises a compacting mechanism so as to facilitate reducing and alternatively increasing the distance between a from a compacted state, where the seats are close to each other, to a "stretched" state, where the seats are wide apart while the stroller is in the unfolded configuration.

5. The device as claimed in claim 4, wherein the compacting mechanism comprises a foot actuator.

6. The device as claimed in claim 1, wherein the wheels assembly comprises at least three wheels.

7. The device as claimed in claim 1, wherein the wheels assembly comprises at least four wheels.

8. The device as claimed in claim 1, wherein the push-handle is foldable.

9. The device as claimed in claim 1, wherein the length of the push-handle is adjustable.

10. The device as claimed in claim 1, wherein each of the wheels assembly comprises an elevating mechanism for elevating at least one of the wheels with respect to the other wheels such that the stroller device rests on the four rear wheels.

11. The device as claimed in claim 1, wherein at least one of the wheels is detachable from the wheels assembly.

12. The device as claimed in claim 1, wherein the swivel wheels have a fixed position allowing fixing the swivel wheels in at least one orientation.

13. The device as claimed in claim 12, wherein all of the wheels are swivel wheels and can be locked in four incremental 90 degree orientations.

14. The device as claimed in claim 1, wherein the support unit comprises a seat with an adjustable back-rest.

15. The device as claimed in claim 1, wherein the support unit comprises an adjustable leg-rest.

16. The device as claimed in claim 1, wherein the carriage is foldable.

\* \* \* \* \*